(12) United States Patent
Geen

(10) Patent No.: US 6,848,304 B2
(45) Date of Patent: Feb. 1, 2005

(54) SIX DEGREE-OF-FREEDOM MICRO-MACHINED MULTI-SENSOR

(75) Inventor: John A. Geen, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/463,653

(22) Filed: Jun. 17, 2003

(65) Prior Publication Data

US 2004/0211258 A1 Oct. 28, 2004

Related U.S. Application Data

(60) Provisional application No. 60/466,083, filed on Apr. 28, 2003.

(51) Int. Cl.[7] .................................................. G01P 9/04
(52) U.S. Cl. ................................ 73/504.04; 73/504.12
(58) Field of Search ......................... 73/504.04, 504.12, 73/504.14, 504.16, 510

(56) References Cited

U.S. PATENT DOCUMENTS

| | | | |
|---|---|---|---|
| 4,715,227 A | 12/1987 | Pittman | 73/504 |
| 4,744,248 A | 5/1988 | Stewart | 73/505 |
| 4,744,249 A | 5/1988 | Stewart | 73/505 |
| 4,841,773 A | 6/1989 | Stewart | 73/510 |
| 5,007,279 A | 4/1991 | Miall | 72/394 |
| 5,313,835 A | 5/1994 | Dunn | 73/505 |
| 5,377,544 A * | 1/1995 | Dunn | 73/504.12 |
| 5,392,650 A | 2/1995 | O'Brien et al. | 73/517 |
| 5,590,460 A | 1/1997 | DiStefano et al. | 29/830 |
| 5,712,426 A | 1/1998 | Sapuppo et al. | 73/504.03 |
| 5,869,760 A | 2/1999 | Geen | 73/504.12 |
| 5,894,091 A * | 4/1999 | Kubota | 73/504.12 |
| 5,992,233 A * | 11/1999 | Clark | 73/504.12 |
| 6,305,222 B1 | 10/2001 | Johnson et al. | 73/504.12 |
| 6,308,569 B1 | 10/2001 | Stewart | 73/504.32 |
| 6,508,122 B1 | 1/2003 | McCall et al. | 73/504.12 |

* cited by examiner

Primary Examiner—John E. Chapman
(74) Attorney, Agent, or Firm—Weingarten, Schurgin, Gägnebin & Lebovici LLP

(57) ABSTRACT

A six degree-of-freedom micro-machined multi-sensor that provides 3-axes of acceleration sensing, and 3-axes of angular rate sensing, in a single multi-sensor device. The six degree-of-freedom multi-sensor device includes a first multi-sensor substructure providing 2-axes of acceleration sensing and 1-axis of angular rate sensing, and a second multi-sensor substructure providing a third axis of acceleration sensing, and second and third axes of angular rate sensing. The first and second multi-sensor substructures are implemented on respective substrates within the six degree-of-freedom multi-sensor device.

29 Claims, 10 Drawing Sheets

SIX DEGREE-OF-FREEDOM MICRO-MACHINED MULTI-SENSOR

CROSS REFERENCE TO RELATED APPLICATIONS

This application claims priority of U.S. Provisional Patent Application No. 60/466,083 filed Apr. 28, 2003 entitled SIX DEGREE-OF-FREEDOM MICRO-MACHINED MULTI-SENSOR.

STATEMENT REGARDING FEDERALLY SPONSORED RESEARCH OR DEVELOPMENT

N/A

BACKGROUND OF THE INVENTION

The present invention relates generally to integrated angular rate and acceleration sensors ("multi-sensors"), and more specifically to a six degree-of-freedom micro-machined multi-sensor device capable of providing 3-axis of acceleration sensing and 3-axes of angular rate sensing.

Micro-machined multi-sensors are known that comprise at least one accelerometer for providing indications of acceleration sensing and angular rate sensing in a single multi-sensor device. A conventional micro-machined multi-sensor, as described in U.S. Pat. No. 5,392,650 issued Feb. 28, 1995 entitled MICRO-MACHINED ACCELEROMETER GYROSCOPE, comprises a pair of accelerometers, in which each accelerometer includes a rigid accelerometer frame anchored to a substrate, and a proof mass suspended from the rigid frame by a plurality of flexures. The micro-machined multi-sensor typically has a single acceleration-sensing axis, and a single rotation-sensing axis perpendicular to the acceleration axis, associated therewith. Further, the micro-machined multi-sensor is typically configured for simultaneously vibrating the proof masses in antiphase along a vibration axis, which is perpendicular to the acceleration and rotation axes.

In the event the conventional micro-machined multi-sensor is subjected to linear and rotational motions while the proof masses are simultaneously vibrated in an antiphase manner, forces of linear and Coriolis acceleration are generated that deflect the proof masses relative to the substrate. The multi-sensor is configured to sense the deflections of the respective proof masses, and to produce corresponding acceleration sense signals having values proportional to the magnitude of the deflection. Because the responses of the vibrating proof masses to linear acceleration are in phase, and the responses of the proof masses to Coriolis acceleration are in antiphase, the linear acceleration components (containing the acceleration sensing information), and the rotational acceleration components (containing the angular rate sensing information), of the sense signals can be separated by suitably adding or subtracting the signals to cancel the rotational or linear components, respectively.

One drawback of the above-described conventional micro-machined multi-sensor is that it typically provides only 1-axis of acceleration sensing, and only 1-axis of angular rate sensing. However, it is often advantageous to provide more than one axis of acceleration sensing and/or angular rate sensing in a single micro-machined multi-sensor device.

A second conventional micro-machined sensor capable of measuring rates of rotation relative to two rotation-sensing axes is described in U.S. Pat. No. 5,869,760 issued Feb. 9, 1999 entitled MICRO-MACHINED DEVICE WITH ROTATIONALLY VIBRATED MASSES. The micro-machined sensor comprises a pair of accelerometers, in which each accelerometer includes a mass in the form of a circular beam suspended over a substrate by a plurality of flexures, and an adjacent pair of acceleration-sensing electrodes. The two rotation-sensing axes associated with the micro-machined sensor are in the plane of the substrate. Further, the micro-machined sensor is configured for rotationally vibrating the circular beams in an antiphase manner, i.e., alternately rotating one circular beam clockwise/counterclockwise while the other beam simultaneously rotates in the opposite direction by substantially the same amount.

In the event the second conventional micro-machined sensor is subjected to linear and rotational motions while the circular beams are simultaneously rotated in antiphase, forces of linear and Coriolis acceleration are generated that deflect the beams relative to the substrate. The acceleration-sensing electrodes sense the deflections of the respective beams, and produce corresponding acceleration sense signals proportional to the magnitude of the deflection and the rate of rotation relative to the rotation-sensing axes. Because the sign of the rotational acceleration components (containing the angular rate sensing information) of the sense signals corresponds to the direction of rotation of the circular beams, the rotational components can be separated from the linear acceleration components of the sense signals by suitably subtracting the signals to cancel the linear components. However, although the micro-machined sensor is capable of providing more than one axis of angular rate sensing, it has drawbacks in that it typically provides no acceleration sensing information.

It would therefore be desirable to have a micro-machined multi-sensor that provides more than one axis of acceleration sensing, and more than one axis of angular rate sensing, in a single multi-sensor device. Such a micro-machined multi-sensor device would avoid the drawbacks of the above-described conventional micro-machined sensor devices.

BRIEF SUMMARY OF THE INVENTION

In accordance with the present invention, a six degree-of-freedom micro-machined multi-sensor is disclosed that provides 3-axes of acceleration sensing, and 3-axes of angular rate sensing, in a single multi-sensor device. The presently disclosed micro-machined multi-sensor device includes two multi-sensor substructures, in which each substructure provides 3-axes of acceleration sensing and angular rate sensing.

In one embodiment, the six degree-of-freedom micro-machined multi-sensor device includes a first multi-sensor substructure, and a second multi-sensor substructure. The first multi-sensor substructure includes a rigid accelerometer frame, a first proof mass, and a second proof mass, each being formed on a first silicon substrate. The first substructure has first and second mutually orthogonal acceleration-sensing axes in the plane of the first substrate, and a first rotation-sensing axis perpendicular to the first and second acceleration axes, associated therewith. The first and second proof masses have a common axis of symmetry along a vibration axis, which is perpendicular to the first rotation axis. Further, the first and second proof masses are resiliently coupled to one another along the vibration axis. The first and second proof masses are suspended from the rigid frame by respective pluralities of flexures, and the rigid frame is anchored to the first substrate by a plurality of flexures. The flexures are configured to constrain the first and second proof masses to move more easily in the linear direction of the vibration axis relative to the rigid frame, and to constrain the rigid frame to move substantially only in a rotational manner relative to the first substrate.

In the presently disclosed embodiment, the first multi-sensor substructure includes a drive electrode structure configured to cause the first and second proof masses to vibrate linearly in antiphase along the vibration axis. The first substructure further includes a first pair of diametrically opposed acceleration sense electrode structures coupled to the rigid frame and disposed along the first acceleration axis, and a second pair of diametrically opposed acceleration sense electrode structures coupled to the rigid frame and disposed along the second acceleration axis. The first multi-sensor substructure is configured (1) to add the sense signals provided by the first acceleration sense electrode pair to extract information pertaining to acceleration sensing along the first acceleration axis, (2) to add the sense signals provided by the second acceleration sense electrode pair to extract information pertaining to acceleration sensing along the second acceleration axis, and (3) to add the difference of the sense signals provided by the first acceleration sense electrode pair and the difference of the sense signals provided by the second acceleration sense electrode pair to extract information pertaining to angular rate sensing relative to the first rotation axis, of the six degree-of-freedom multi-sensor device.

The second multi-sensor substructure includes a third proof mass and a fourth proof mass formed on a second silicon substrate. The third and fourth proof masses are suspended over and anchored to the second substrate by a respective plurality of flexures. The second substructure has second and third mutually orthogonal rotation-sensing axes in the plane of the second substrate, and a third acceleration-sensing axis perpendicular to the second and third rotation axes, associated therewith. Further, each of the third and fourth proof masses has lateral and longitudinal axes of symmetry, and a driven rotation axis perpendicular to the lateral and longitudinal axes, associated therewith. Respective third pairs of acceleration sense electrode structures are disposed along the lateral axes, and respective fourth pairs of acceleration sense electrode structures are disposed along the longitudinal axes, of the respective third and fourth proof masses. The second substructure further includes a fork member configured to couple the third and fourth proof masses to allow relative antiphase movement, and to resist in phase movement, of the masses. The pluralities of flexures anchoring the third and fourth proof masses to the second substrate are configured to constrain the masses to move substantially only in a rotational manner relative to the second substrate.

In the presently disclosed embodiment, the second multi-sensor substructure includes a drive electrode structure configured for rotationally vibrating the third and fourth proof masses in antiphase, i.e., alternately rotating one mass clockwise/counterclockwise about its rotation axis, while the other mass simultaneously rotates about its rotation axis in the opposite direction by substantially the same amount. In the event the second multi-sensor substructure with the rotationally vibrating masses is subjected to linear and/or rotational motion, the third and fourth pairs of acceleration sense electrodes produce electrically independent acceleration sense signals based on forces of linear and Coriolis acceleration imposed on the third and fourth proof masses. The second substructure is configured (1) to add the difference of the accelerations sensed by the third pair of acceleration sense electrodes associated with the third proof mass, and the difference of the accelerations sensed by the third pair of acceleration sense electrodes associated with the fourth proof mass, to obtain information pertaining to angular rate sensing relative to the second rotation axis, (2) to add the difference of the accelerations sensed by the fourth pair of acceleration sense electrodes associated with the third proof mass, and the difference of the accelerations sensed by the fourth pair of acceleration sense electrodes associated with the fourth proof mass, to obtain information pertaining to angular rate sensing relative to the third rotation axis, and (3) to add the sum of the accelerations sensed by the third pair of acceleration sense electrodes associated with the third proof mass, the sum of accelerations sensed by the third pair of acceleration sense electrodes associated with the fourth proof mass, the sum of accelerations sensed by the fourth pair of acceleration sense electrodes associated with the third proof mass, and the sum of accelerations sensed by the fourth pair of acceleration sense electrodes associated with the fourth proof mass, to obtain information pertaining to acceleration sensing relative to the third acceleration axis, of the six degree-of-freedom multi-sensor device.

By providing a micro-machined multi-sensor including a first multi-sensor substructure that provides 2-axes of acceleration sensing and 1-axis of angular rate sensing, and a second multi-sensor substructure that provides a third axis of acceleration sensing, and second and third axes of angular rate sensing, 3-axes of acceleration sensing and 3-axes of angular rate sensing can be obtained in a single multi-sensor device.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

U.S. Provisional Patent Application No. 60/466,083 filed Apr. 28, 2003 entitled SIX DEGREE-OF-FREEDOM MICRO-MACHINED MULTI-SENSOR is incorporated herein by reference.

A six degree-of-freedom micro-machined multi-sensor is disclosed that provides 3-axes of acceleration sensing, and 3-axes of angular rate sensing, in a single multi-sensor device. The presently disclosed micro-machined multi-sensor includes two three degree-of-freedom multi-sensor substructures, each of which can be symmetrically laid out on a respective die to improve yield as well as the performance of the overall multi-sensor device.

Figure 1:
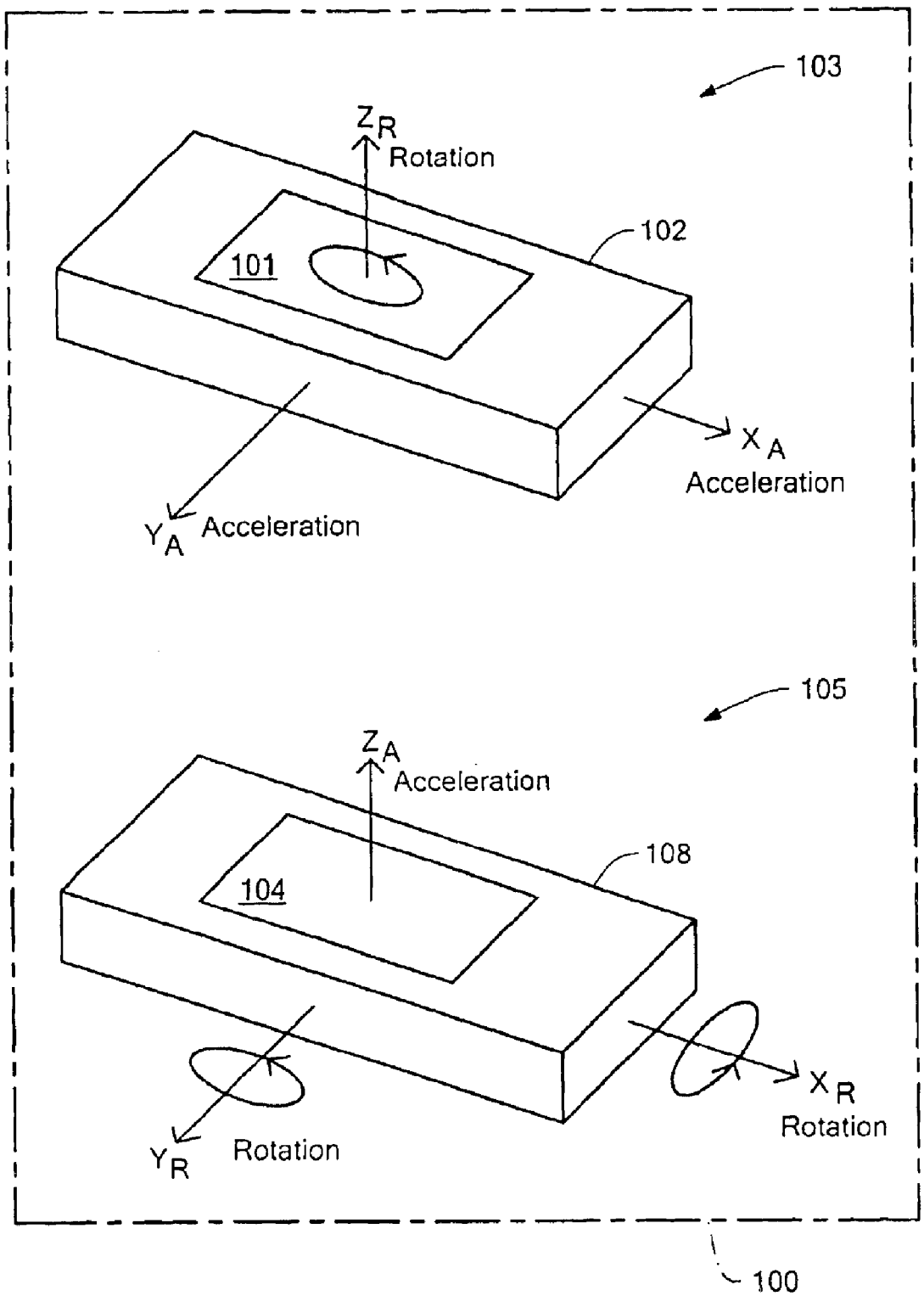
FIG. 1 is a conceptual perspective view of a silicon micro-machined multi-sensor device according to the present invention.

FIG. 1 depicts a conceptual view of a six degree-of-freedom micro-machined multi-sensor 100, in accordance with the present invention. The presently disclosed six degree-of-freedom multi-sensor 100 comprises a first three degree-of-freedom multi-sensor substructure 103 including a substrate 102, and a second three degree-of-freedom multi-sensor substructure 105 including a substrate 108. Each of the substrates 102 and 108 may comprise a silicon substrate, which is subjected to any suitable bulk micro-machining process to form a Micro Electro Mechanical System (MEMS) multi-sensor device.

As shown in FIG. 1, the MEMS substructure 103 includes a sensor 101 having two associated mutually orthogonal acceleration-sensing axes $X_A$ and $Y_A$ disposed in the plane of the substrate 102, and one associated rotation-sensing axis $Z_R$ perpendicular to the acceleration axes $X_A$ and $Y_A$. The MEMS substructure 103 is configured to provide two indications of acceleration sensing along the acceleration axes $X_A$ and $Y_A$, and one indication of angular rate sensing relative to the rotation axis $Z_R$. Moreover, the MEMS substructure 105 includes a sensor 104 having two associated mutually orthogonal rotation-sensing axes $X_R$ and $Y_R$ in the plane of the substrate 108, and one associated acceleration-sensing axis $Z_A$ perpendicular to the rotation axes $X_R$ and $Y_R$. The MEMS substructure 105 is configured to provide two indications of angular rate sensing relative to the rotation axes $X_R$ and $Y_R$, and one indication of acceleration sensing relative to the acceleration axis $Z_A$.

It should be appreciated that the overall six degree-of-freedom multi-sensor device 100 effectively has two associated mutually orthogonal X and Y axes (not shown) in the plane of the device, and one associated Z axis (not shown) perpendicular to the X and Y axes. For example, the substrates 102 and 108 may be coplanar, and the X and Y axes may be in the plane of the substrates 102 and 108. Further, the six degree-of-freedom multi-sensor device 100 is configured to provide an indication of acceleration sensing and an indication of angular rate sensing relative to each of the three axes X, Y, and Z. The MEMS substructures 103 and 105 included in the multi-sensor 100 are depicted as having the two sets of axes $X_A$, $Y_A$, $Z_R$, and $X_R$, $Y_R$, $Z_A$, respectively, for clarity of discussion.

Figure 2:
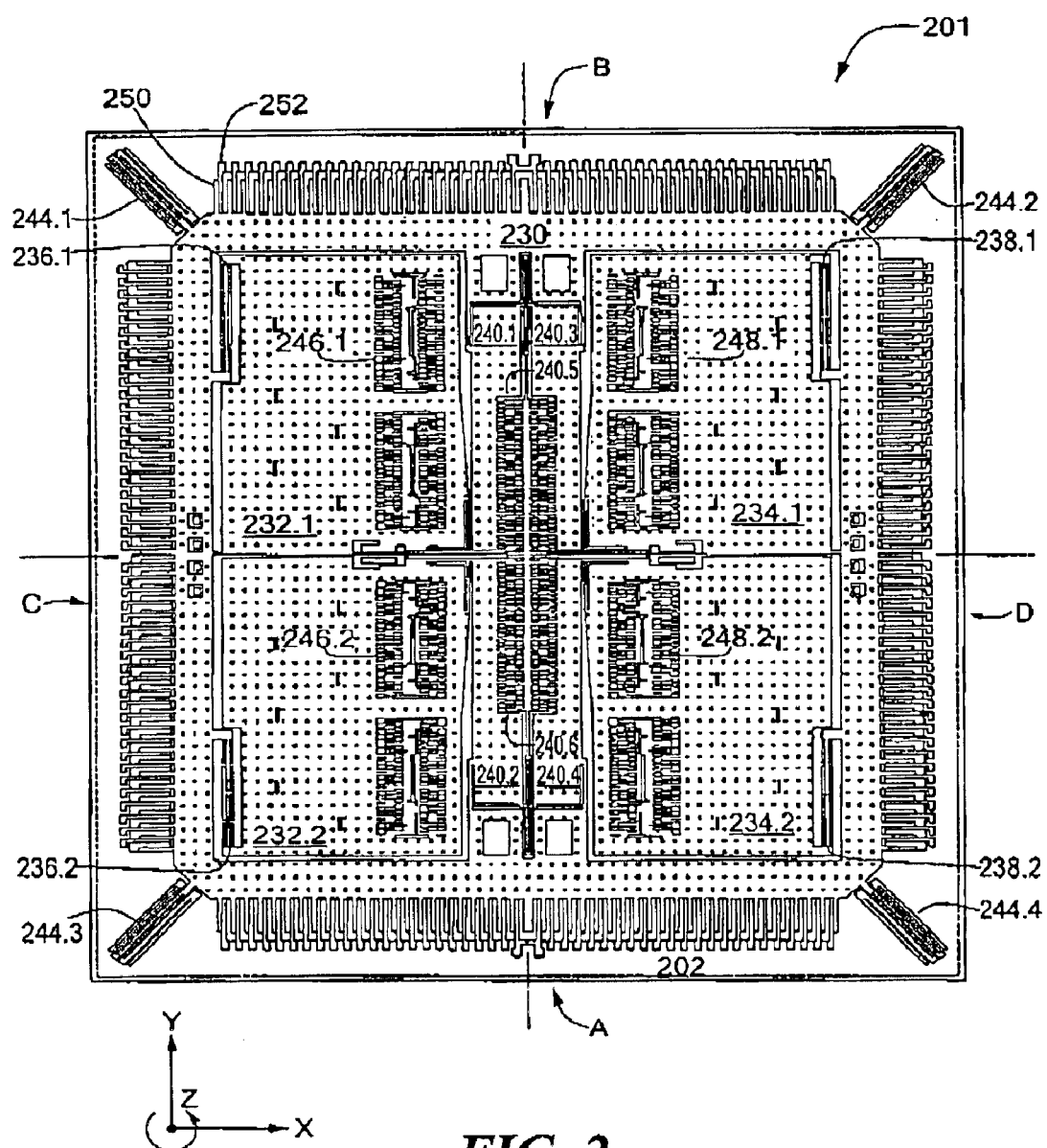
FIG. 2 is a plan view of a first multi-sensor substructure included in the silicon micro-machined multi-sensor of FIG. 1.

FIG. 2 depicts an illustrative embodiment 201 of the sensor 101 included in the MEMS substructure 103 (see FIG. 1). In the illustrated embodiment, the sensor 201 includes a rigid accelerometer frame 230, and proof masses 232.1–232.2 and 234.1–234.2, formed on a substrate 202. The proof masses 232.1–232.2 are suspended from the rigid frame 230 by resonator flexures 236.1–236.2, respectively, and the proof masses 234.1–234.2 are suspended from the rigid frame by resonator flexures 238.1–238.2, respectively. Moreover, the rigid frame 230 is anchored to the substrate by accelerometer flexures 244.1–244.4, which are diagonally disposed on the substrate 202.

The sensor 201 further includes drive electrode structures 246.1–246.2 and 248.1–248.2, and acceleration sense electrode structures A–D. As shown in FIG. 2, the drive electrode structures 246.1–246.2 and 248.1–248.2 include respective pluralities of drive electrodes ("fingers"), which are parallel to and interdigitated with one another. The drive electrode structures 246.1–246.2 are configured to exert electrostatic forces on the proof masses 232.1–232.2, respectively, and the drive electrode structures 248.1–248.2 are configured to exert electrostatic forces on the proof masses 234.1–234.2, respectively, in response to drive signals (not shown) comprising alternating voltages. It is understood that the drive electrode structures 246.1–246.2 and 248.1–248.2 may alternatively comprise electromagnetic drive structures configured to exert electromagnetic forces on the proof masses 232.1–232.2 and 234.1–234.2, respectively, in response to alternating current signals. It is also understood that some drive electrodes may be put to the alternative use of providing a velocity signal that gives feedback for the drive electronics and a reference for the Coriolis signal processing.

As further shown in FIG. 2, the acceleration sense electrode structures A–D include respective pluralities of sense electrodes ("fingers") that are parallel to and interdigitated with one another. Specifically, the sense electrode structures A, B, C, and D include respective first sets of sense fingers integrally coupled to the rigid frame 230, and corresponding second sets of sense fingers fixed to the substrate 202. For example, in the event the sensor 201 is subjected to linear and/or rotational motion, the rigid frame 230 deflects relative to the substrate 202 in response to resulting linear acceleration and/or Coriolis forces. Because the rigid frame 230 and the first sets of sense fingers associated with the sense electrode structures A–D (see, e.g., the sense finger 250 associated with the sense electrode structure B) move with the rigid frame 230 as it deflects, while the second sets of sense fingers (see, e.g., the sense finger 252 associated with the sense electrode structure B) remain anchored to the substrate 202, the sense electrode structures A–D sense the deflection of the frame 230 by sensing the relative movement of the first and second sets of sense fingers, and produce sense signals A'–D' (see FIG. 3) having magnitudes proportional to the magnitude of the deflection. It should be appreciated that the sense electrode structures A, C, and D have sense finger configurations like the finger configuration of the sense electrode structure B.

The sensor 201 further includes a plurality of levers 240.1–240.4 suspended from the rigid frame 230, and drive electrode structures 240.5–240.6 for the levers 240.1–240.4. Specifically, the lever 240.1 is resiliently coupled between the proof mass 232.1 and the lever 240.3, the lever 240.2 is resiliently coupled between the proof mass 232.2 and the lever 240.4, the lever 240.3 is resiliently coupled between the proof mass 234.1 and the lever 240.1, and the lever 240.4 is resiliently coupled between the proof mass 234.2 and the lever 240.2. The purpose of the levers 240.1–240.4 is to couple the motions of the proof masses such that they oscillate as a single resonance. Further, the drive electrode structures 240.5–240.6 include respective pluralities of drive fingers disposed in parallel and interdigitated with one another. The drive electrode structure 240.5 is configured to exert electrostatic forces on the levers 240.1 and 240.3, and the drive electrode structure 240.6 is configured to exert electrostatic forces on the levers 240.2 and 240.4. It is understood that the drive electrode structures 240.5–240.6 may alternatively comprise respective electromagnetic drive structures.

It is noted that the proof mass 232.1 is mechanically coupled to the proof mass 232.2 so that the proof masses 232.1–232.2 move substantially together as a single mass. Similarly, the proof mass 234.1 is mechanically coupled to the proof mass 234.2 so that the proof masses 234.1–234.2 move substantially together as a single mass. Further, the flexures 236.1–236.2 suspending the proof masses 232.1–232.2 from the rigid frame 230 are configured to constrain the proof masses 232.1–232.2 to move substantially only in the direction of the axis $X_A$ relative to the frame 230. Similarly, the flexures 238.1–238.2 suspending the proof masses 234.1–234.2 from the rigid frame 230 are configured to constrain the proof masses 234.1–234.2 to move substantially only in the direction of the axis $X_A$ relative to the frame 230. The flexures 244.1–244.4 anchoring the rigid frame 230 to the substrate 202 are configured to constrain the rigid frame 230 to allow rotational movement of the frame 230 relative to the substrate 202 for Coriolis sensing.

The diagonal flexures 244.1–244.4 form folded pairs so that, unlike single flexures arranged as diagonal spokes, they allow some translational motion. This is to relieve the stress in the deposited film used for surface micro-machining and to allow linear acceleration sensing along the $X_A$ and $Y_A$ axes. The Coriolis acceleration is generally much smaller than the linear acceleration to be sensed so it is desirable to have the flexures 244.1–244.4 more compliant to rotational motion than along the $X_A$ and $Y_A$ axes. The desired ratio of compliance can be created by using the appropriate ratio of flexure length to fold separation.

It is further noted that the rigid frame 230, the proof masses 232.1–232.2 and 234.1–234.2, the drive electrode structures 246.1–246.2, 248.1–248.2, and 240.5–240.6, the acceleration sense electrode structures A–D, the levers 240.1–240.4, and the flexures 236.1–236.2, 238.1–238.2, and 244.1–244.4 are arranged in mirror image fashion on each side of a lateral axis of symmetry, and on each side of a vertical axis of symmetry, of the sensor 201. Accordingly, the sensor 201 has two orthogonal mirror symmetries and can be symmetrically centered on a die (not shown) to reduce the adverse effects of die surface area distortions and gradients on the performance of the sensor.

Figure 3:
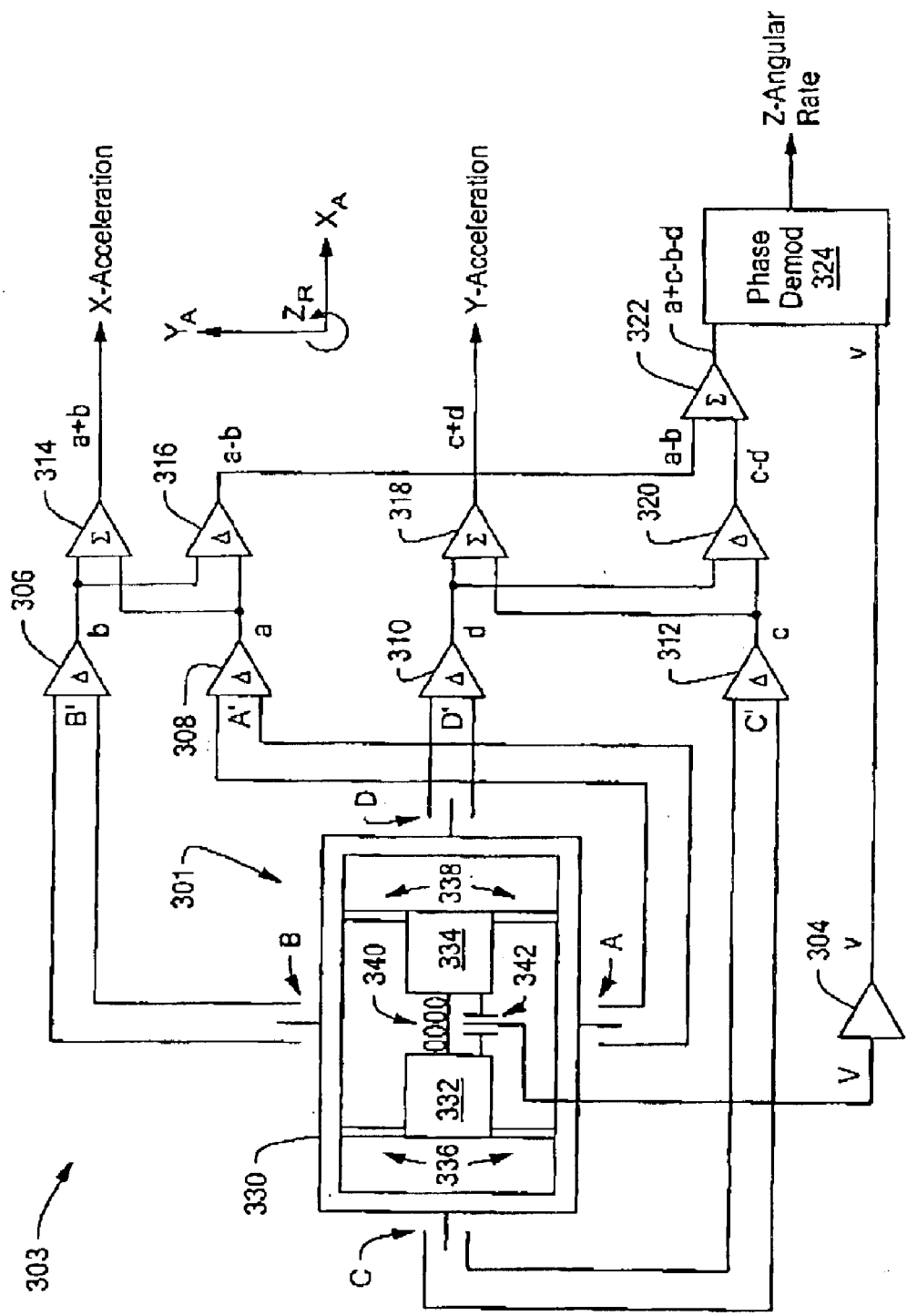
FIG. 3 is a schematic diagram of the first multi-sensor substructure of FIG. 2.

FIG. 3 depicts a schematic diagram of an illustrative embodiment 303 of the MEMS substructure 103 of FIG. 1. In the illustrated embodiment, the MEMS substructure 303 includes a sensor 301, a transresistance amplifier 304, a plurality of difference amplifiers 306, 308, 310, 312, 316, and 320, a plurality of summing amplifiers 314, 318, and 322, and a phase demodulator 324. As described above, the proof masses 232.1–232.2 (see FIG. 2) are coupled together to move as a single mass, and the proof masses 234.1–234.2 (see FIG. 2) are similarly coupled together to move as a single mass. Accordingly, the sensor 301 includes a rigid accelerometer frame 330 representing the rigid frame 230 (see FIG. 2), a first proof mass 332 representing the proof masses 232.1–232.2, and a second proof mass 334 representing the proof masses 234.1–234.2.

Specifically, the first proof mass 332 is suspended from the rigid frame 330 by resonator flexures 336, which are representative of the flexures 236.1–236.2 (see FIG. 2), and the second proof mass 334 is suspended from the rigid frame 330 by resonator flexures 338, which are representative of the flexures 238.1–238.2 (see FIG. 2). Further, the rigid frame 330 is anchored to a substrate (e.g., the substrate 202, see FIG. 2) by a plurality of accelerometer flexures (e.g., the flexures 244.1–244.4, see FIG. 2).

The sensor 301 (see FIG. 3) further includes a resilient member 340 representing the levers and drive electrode structures 240.1–240.6 (see FIG. 2). The resilient member 340 resiliently interconnects the first proof mass 332 and the second proof mass 334. Moreover, the sensor 301 includes drive electrode structures (e.g., the drive electrode structures 246.1–246.2 and 248.1–248.2, see FIG. 2) for vibrating the proof masses 332 and 334, and acceleration sense electrode structures A, B, C, and D representing the sense electrode structures A–D of FIG. 2.

Specifically, the drive electrode structures are configured to vibrate the respective first and second proof masses 332 and 334 simultaneously at mechanical resonance, and the resilient member 340 is configured to move the proof masses 332 and 334 in antiphase (i.e., 180° out-of-phase) along a vibration axis, which in the presently disclosed embodiment is parallel to the acceleration axis $X_A$. The diametrically opposed acceleration sense electrode structures A–B are disposed along the acceleration axis $Y_A$ and coupled to the rigid frame 330, and the diametrically opposed acceleration sense electrode structures C–D are disposed along the acceleration axis $X_A$ and coupled to the rigid frame 330. The respective sense electrode structures A–D are configured to produce electrically independent sense signals A', B', C', and D', respectively. Alternatively, the spring forces from the deflection of the flexures 244.1–244.4 attaching the frame to the substrate may be used to balance the Coriolis forces and the structures A, B, C, and D used to sense those deflections. If the structural film used for the surface micro-machining is polysilicon, then the deflection of the flexures is very linearly related to the forces so that it is uneconomical to introduce the complication of electrical restoring forces.

Those of ordinary skill in the art will appreciate that as the proof masses 332 and 334 vibrate along the vibration axis, while the rigid frame 330 rotates about the rotation axis $Z_R$, each of the proof masses 332 and 334 undergoes Coriolis acceleration in the plane defined by the acceleration axes $X_A$ and $Y_A$. Further, because the proof masses 332 and 334 vibrate in antiphase, the respective proof masses 332 and 334 undergo Coriolis acceleration in opposite directions. As a result, apparent Coriolis forces are applied to the proof masses 332 and 334, deflecting the proof masses 332 and 334 in opposing directions within the plane of the acceleration axes $X_A$ and $Y_A$.

Accordingly, the responses of the proof masses 332 and 334 to Coriolis acceleration relative to the rotation axis $Z_R$ are in antiphase, while the responses of the proof masses 332 and 334 to linear acceleration relative to the acceleration axes $X_A$ and $Y_A$ are in phase. The electrically independent acceleration sense signals A', B', C', and D' are therefore suitably added and/or subtracted to extract information corresponding to the linear acceleration (i.e., the acceleration sensing information), and to extract information corresponding to the Coriolis acceleration (i.e., the angular rate sensing information). For example, a first set of electrical restoring forces (not shown) may be employed to balance the forces of linear acceleration, and a second set of electrical restoring forces (not shown) may be employed to balance the forces of Coriolis acceleration. Further, the respective sense electrode structures A, B, C, and D may be configured to produce the electrically independent acceleration sense signals A', B', C', and D' based on the magnitudes of the electrical restoring forces.

Specifically, the difference amplifier 306 is configured to receive the differential sense signal B' from the sense electrode structure B, and to provide a corresponding sense signal b to the summing amplifier 314 and the difference amplifier 316. Similarly, the difference amplifier 308 is configured to receive the differential sense signal A' from the sense electrode structure A, and to provide a corresponding sense signal a to the summing amplifier 314 and the difference amplifier 316. Further, the difference amplifier 310 is configured to receive the differential sense signal D' from the sense electrode structure D, and to provide a corresponding sense signal d to the summing amplifier 318 and the difference amplifier 320, and the difference amplifier 312 is configured to receive the differential sense signal C' from the sense electrode structure C, and to provide a corresponding sense signal c to the summing amplifier 318 and the difference amplifier 320.

The summing amplifier 314 is configured to add the sense signals a and b, and to produce the sum of the sense signals a+b, which contains information pertaining to the acceleration sensing along the acceleration axis $X_A$ ("X-Acceleration"). Similarly, the summing amplifier 318 is configured to add the sense signals c and d, and to produce the sum of the sense signals c+d, which contains information pertaining to the acceleration sensing along the acceleration axis $Y_A$ ("Y-Acceleration"). Those of ordinary skill in this art will appreciate that an additional phase-locked carrier may also be required to extract the acceleration sensing information.

The difference amplifier 316 is configured to subtract the sense signals a and b, and to provide the difference of the sense signals a–b to the summing amplifier 322. Similarly, the difference amplifier 320 is configured to subtract the sense signals c and d, and to provide the difference of the sense signals c–d to the summing amplifier 322. Moreover, the summing amplifier 322 is configured to add the sense signals a–b and c–d, and to provide the sum a+c–b–d to the phase demodulator 324. The sense signal a+c–b–d includes information pertaining to the angular rate sensing relative to the rotation axis $Z_R$ ("Z-Angular Rate"). It is noted, however, that the sense signal a+c–b–d may also include at least some information pertaining to the acceleration sensing along one or both of the acceleration axes $X_A$ and $Y_A$. Accordingly, the phase demodulator 324 is configured to suppress the acceleration information in the gyroscopic sense signal a+c–b–d.

Specifically, the phase demodulator 324 demodulates the gyroscopic sense signal a+c–b–d against a velocity sense signal V, which is in phase with the vibration velocity of the proof masses 332 and 334, and asynchronous with the proof mass acceleration. As shown in FIG. 3, the sensor 301 includes a velocity sense electrode structure 342 configured to provide the velocity sense signal V (a current signal) to the transresistance amplifier 304, which converts the current signal to a corresponding voltage signal v. The velocity sense electrode structure 342 senses the vibration velocity of the proof masses 332 and 334 by sensing the relative movement of electrodes coupled to the proof masses 332 and 334, and electrodes anchored to the substrate, and produces the velocity sense signal V, which is in phase with the vibration velocity. Next, the transresistance amplifier 304 provides the voltage signal v as a phase reference to the phase demodulator 324. Because the velocity sense signal V is asynchronous with the acceleration signals a+b and c+d, the acceleration information at the output of the summing amplifier 322 is suppressed by the phase demodulator 324, thereby increasing the gyroscopic Signal-to-Noise Ratio (SNR) at the phase demodulator output.

It will be appreciated that in order to sense static deflections of the accelerometer electrodes A, B, C, and D by differential capacitance it is necessary to provide an alternating voltage to the frame 330, and to synchronously demodulate the signals against that voltage. Such demodulation may be performed either in the difference amplifiers 306, 308, 310, and 312 or in the summing amplifiers 314, 316, 318, and 322. To improve sensitivity, the alternating voltage should be at as high a frequency as is practical. To prevent errors from relative frequency drift, the alternating voltage should be related to the velocity signal using a phase-locked-loop, which is well known to those skilled in this art. It should also be noted that the various amplifiers, shown here discretely for ease of explanation, can be combined into a more efficient arrangement of transistors in an integrated circuit, and that the precise order of the operations will then be lost while the overall function is preserved. In particular, if a continuous time (i.e., amplifier based) implementation is chosen, then the integrity of the process is best preserved by maintaining differential signal paths as far as the phase demodulator. If a discrete time (i.e., digital) approach is used, then it is often efficient to merge the addition, subtraction, demodulation, and/or filtering operations.

Figure 4:
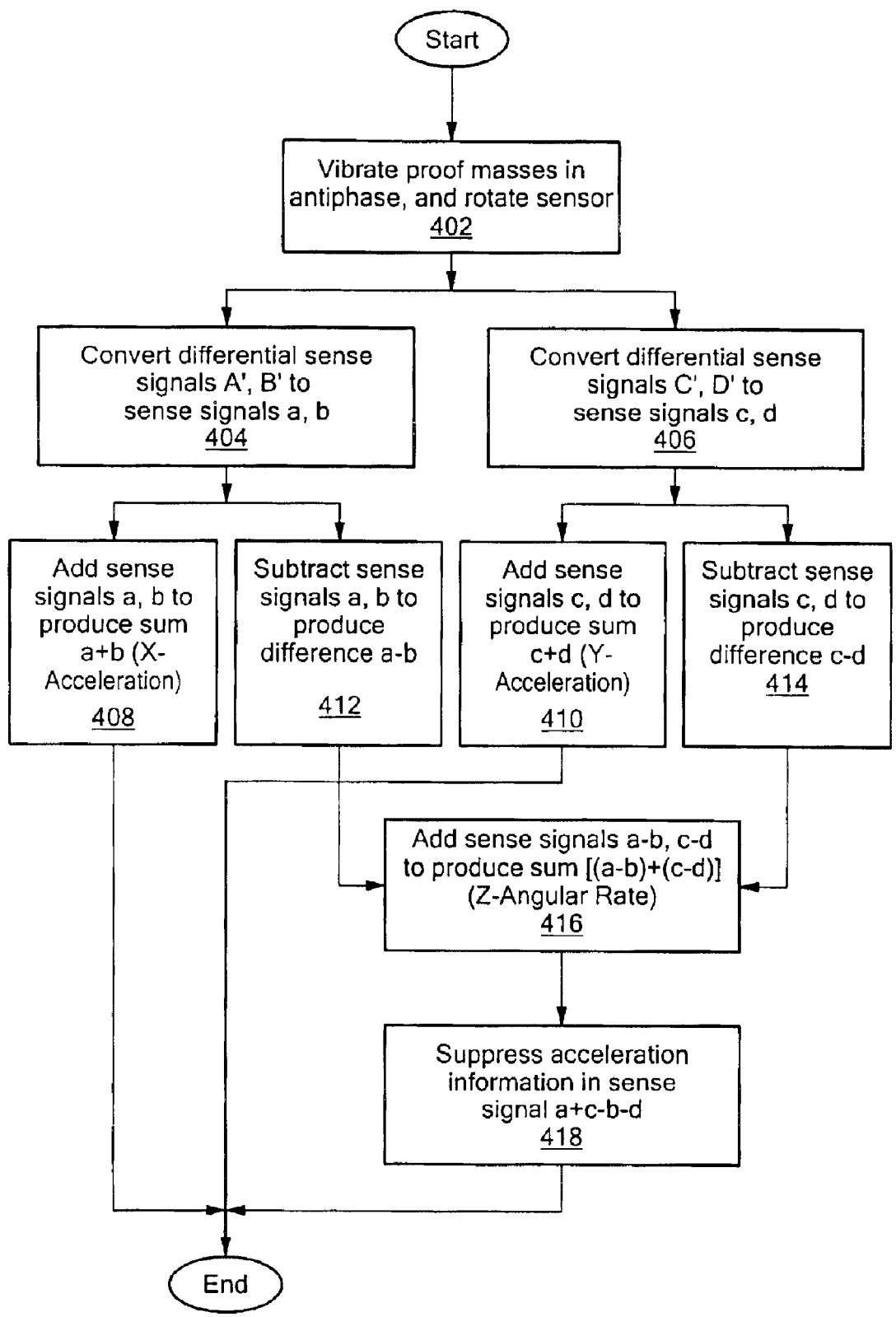
FIG. 4 is a flow diagram of a method of operating the first multi-sensor substructure of FIG. 2.

A method of operating the presently disclosed multi-sensor substructure 303 (see FIG. 3) is illustrated by reference to FIG. 4. As depicted in step 402, the two proof masses included in the multi-sensor substructure 303 are vibrated in antiphase along the vibration axis, while the multi-sensor is rotated about the rotation axis $Z_R$. It is understood that the vibration axis is in the plane of the substrate of the multi-sensor (i.e., parallel to the acceleration axis $X_A$), and the rotation axis $Z_R$ is perpendicular to both the vibration axis and the multi-sensor substrate. Next, the differential sense signals A' and B' produced by the acceleration sense electrode structures A and B of the multi-sensor are converted, as depicted in step 404, to sense signals a and b, respectively. Similarly, the differential sense signals C' and D' produced by the acceleration sense electrode structures C and D are converted, as depicted in step 406, to sense signals c and d, respectively. The acceleration sense electrode structures A and B are disposed along the acceleration axis $X_A$. Further, the acceleration sense electrode structures C and D are disposed along the acceleration axis $Y_A$, which is in the plane of the substrate and perpendicular to the acceleration axis $X_A$. The sense signals a and b are then added, as depicted in step 408, to produce the sum of the sense signals a+b containing information pertaining to the acceleration sensing along the acceleration axis $X_A$ (X-Acceleration). Similarly, the sense signals c and d are added, as depicted in step 410, to produce the sum of the sense signals c+d containing information pertaining to the acceleration sensing along the acceleration axis $Y_A$ (Y-Acceleration). Next, the sense signals a and b are subtracted, as depicted in step 412, to produce the difference of the sense signals a–b. Similarly, the sense signals c and d are subtracted, as depicted in step 414, to produce the difference of the sense signals c–d. The sense signals a–b and c–d are then added, as depicted in step 416, to produce the sum of the sense signals (a–b)+(c–d) including information pertaining to the angular rate sensing relative to the rotation axis $Z_R$ (Z-Angular Rate). Finally, the acceleration information that may be included in the gyroscopic sense signal a+c–b–d is optionally suppressed, as depicted in step 418, to increase the gyroscopic SNR. It will be appreciated by those skilled in signal processing that the illustrative algorithm of FIG. 4 is not the only one that will produce the desired end result, and that other discrete time implementations may be functionally equivalent. For example, the order of addition, subtraction, and demodulation may be suitably interchanged or merged.

Figure 5:
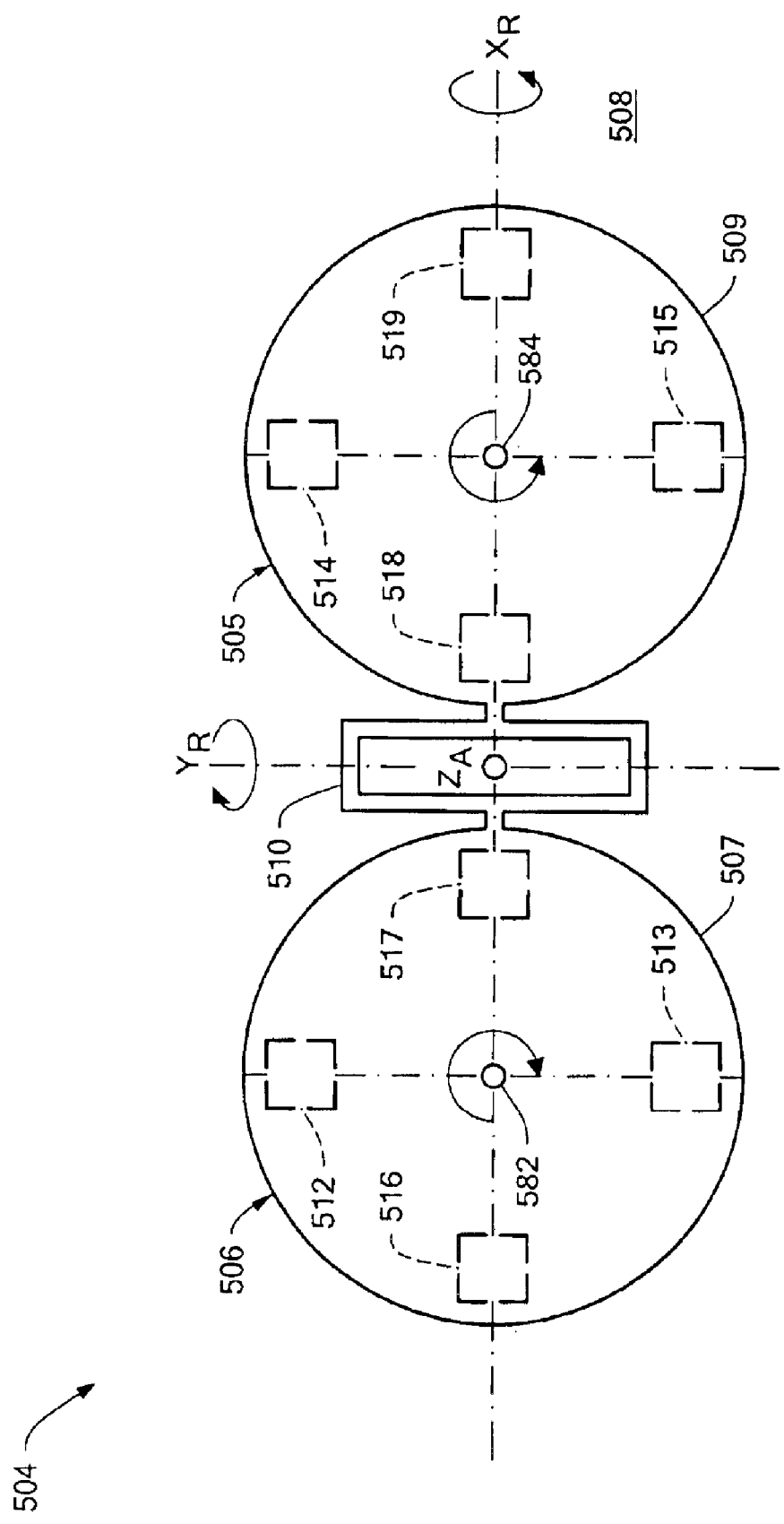
FIG. 5 is a block diagram of a second multi-sensor substructure included in the silicon micro-machined multi-sensor of FIG. 1.

FIG. 5 depicts an illustrative embodiment 504 of the sensor 104 included in the MEMS substructure 105 (see FIG. 1). In the illustrated embodiment, the sensor 504 comprises a pair of accelerometers 505–506. The accelerometers 505–506 include masses 509 and 507, respectively, each of which is substantially circular. It should be understood that the masses 507 and 509 may alternatively be substantially square, hexagonal, octagonal, or any other suitable geometric shape. The circular masses 507 and 509 are anchored to and suspended over a substrate 508 by a plurality of flexures (not shown). The sensor 504 further includes a fork member 510 configured to couple the two circular masses 507 and 509 to allow relative antiphase movement, and to resist in phase movement of the masses. The pluralities of flexures anchoring the circular masses 507 and 509 and suspending them over the substrate 508 are configured to constrain the masses to move substantially only in a rotational manner in a plane parallel to the substrate but also in tilt or translational modes perpendicular to the substrate 508.

For example, the substrate 508 may comprise a silicon substrate, or any other suitable type of substrate. Further, the substrate 508 may be subjected to any suitable bulk micromachining process to form the Micro Electro Mechanical System (MEMS) multi-sensor device. The circular masses 507 and 509 and the coupling fork 510 of the sensor 504 may be formed via any suitable process in the art.

As shown in FIG. 5, the sensor 504 has two associated mutually orthogonal rotation-sensing axes $X_R$ and $Y_R$ in the plane of the substrate 508, and one associated acceleration-sensing axis $Z_A$ perpendicular to the rotation axes $X_R$ and $Y_R$ (i.e., perpendicular to the substrate 508). The sensor 504 is configured to provide two indications of angular rate sensing relative to the rotation axes $X_R$ and $Y_R$, and one indication of acceleration sensing relative to the acceleration axis $Z_A$. Further, each of the circular masses 507 and 509 has lateral and longitudinal axes of symmetry (not labeled), and a rotation axis (i.e., rotation axes 582 and 584, respectively) perpendicular to the lateral and longitudinal axes, associated therewith.

The sensor 504 also includes acceleration sense electrode structures 512–519 disposed along the longitudinal and lateral axes of the respective circular masses 507 and 509. Specifically, the acceleration sense electrode structures 512–513 and 516–517 are diametrically opposed to each other along the longitudinal and lateral axes, respectively, of the circular mass 507, and the acceleration sense electrode structures 514–515 and 518–519 are diametrically opposed to each other along the longitudinal and lateral axes, respectively, of the circular mass 509. Each one of the acceleration sense electrode structures 512–519 includes a first electrode disposed on the surface of the respective circular mass, and a second electrode disposed on the surface of the substrate 508 opposite the first electrode, forming a differential capacitor having a capacitance value that increases/decreases based on the distance between the first and second electrodes. The sensor 504 includes circuitry configured to sense changes in the capacitance values, and to provide electrically independent acceleration sense signals that include information pertaining to angular rate sensing and acceleration sensing relative to the rotation axes $X_R$, $Y_R$, and the acceleration axis $Z_A$, respectively. For example, each of the first and second electrodes of the acceleration sense electrode structures 512–519 may be made from polycrystalline silicon ("polysilicon"), a diffused region, a metal, or any other suitable material.

Figure 6:
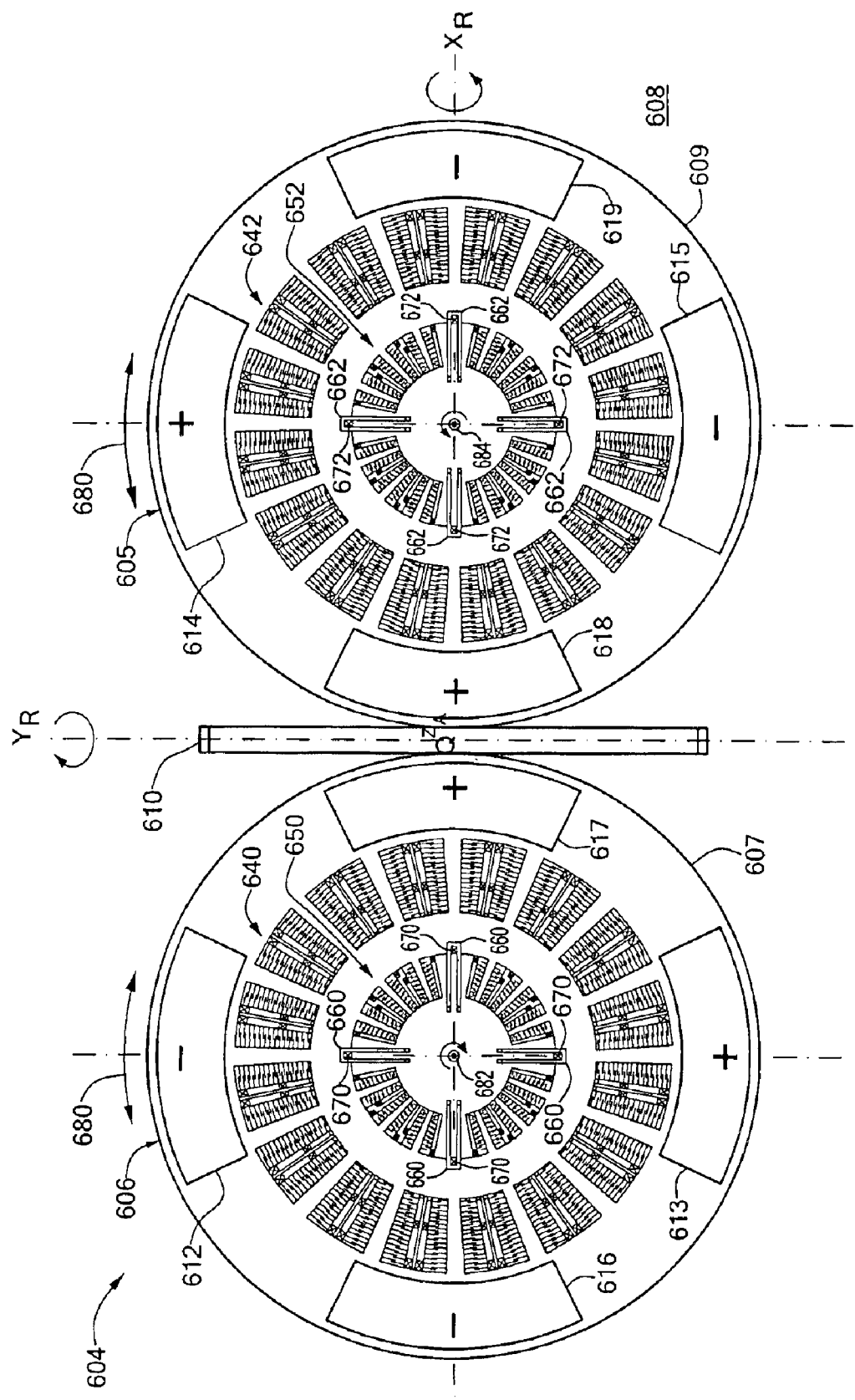
FIG. 6 is a detailed plan view of the second multi-sensor substructure of FIG. 5.

FIG. 6 depicts a detailed plan view 604 of the sensor 104 (see FIG. 1). As shown in FIG. 6, the micro-machined multi-sensor 604 comprises a pair of accelerometers 605–606. The accelerometers 605–606 include substantially circular masses 609 and 607, respectively, which are anchored to and suspended over a substrate 608 such as a silicon substrate by pluralities of flexure structures. Specifically, each of the flexure structures anchoring and suspending the circular mass 607 includes an anchor 670 and a stress relief member 660, and each of the flexure structures anchoring and suspending the circular mass 609 includes an anchor 672 and a stress relief member 662. In the illustrated embodiment, each of the stress relief members 660 and 662 is folded in half with the center free so as to relieve stress. Because this configuration can cause some local asymmetry of restorative forces and moments, the folded members 660 and 662 are arranged in pairs to maintain balance (see FIG. 6).

The sensor 604 further comprises a fork member 610, and acceleration sense electrode structures 612–619. The fork member 610 is configured to couple the two circular masses 607 and 609 to allow relative antiphase rotational movement, and to resist in phase rotational movement, of the masses, as known in the art. The acceleration sense electrode structures 612–619 are disposed along longitudinal and lateral axes of the respective circular masses 607 and 609.

It is noted that the circular masses 607 and 609, the fork member 610, and the acceleration sense electrode structures 612–619 are substantially equivalent to the circular masses 507 and 509, the fork member 510, and the acceleration sense electrode structures 512–519, respectively, of the sensor 504 (see FIG. 5). Further, rotation-sensing axes $X_R$ and $Y_R$ and acceleration-sensing axis $Z_A$, as depicted in FIG. 6, correspond to the rotation-sensing axes $X_R$ and $Y_R$ and the acceleration-sensing axis $Z_A$ described above with reference to FIG. 5.

As shown in FIG. 6, the sensor 604 includes a plurality of drive electrode structures 640 and 642 anchored to the substrate 608, and configured for rotationally vibrating the circular masses 607 and 609 in antiphase, i.e., alternately rotating one mass clockwise/counterclockwise about its rotation axis, while the other mass simultaneously rotates about its rotation axis in the opposite direction by substantially the same amount. Specifically, the drive electrode structures 640 are employed for rotationally vibrating the circular mass 607 about the rotation axis 682, and the drive electrode structures 642 are employed for rotationally vibrating the circular mass 609 about the rotation axis 684. In the presently disclosed embodiment, the drive electrode structures 640 and 642 are disposed along radial axes of the circular masses 607 and 609, respectively. Further, each of the drive electrode structures 640 and 642 includes a plurality of electrodes ("fingers") interdigitated with a corresponding plurality of fingers extending from at least one radial edge of the circular mass 607 and 609, respectively. The drive electrode structures 640 and 642 are coupled to a signal source (not shown) for generating drive signals operative to rotationally vibrate the masses 607 and 609 in antiphase in an oscillating manner, as depicted by directional arrows 680.

It is noted that the primary purpose of the circular geometry is to provide a pivot and lever to translate the anti-parallel linear motions of the diametrically opposed mass segments into a motion suitable for coupling with the fork. Accordingly, the useful motion of the mass segments in generating Coriolis force is the dominant linear component, not rotation as such.

The sensor 604 further includes a plurality of velocity sense electrode structures 650 and 652 anchored to the substrate 608, and configured to sense the vibration velocity of the circular masses 607 and 609, respectively. In the presently disclosed embodiment, the velocity sense electrode structures 650 and 652 are disposed along radial axes of the circular masses 607 and 609, respectively. Further, the velocity sense electrode structures 650 and 652 include pluralities of fingers interdigitated with corresponding pluralities of fingers extending from radial edges of the circular masses 607 and 609, respectively. The interdigitated fingers of the velocity sense electrode structures 650 and 652 form differential capacitors having capacitance values that increase/decrease based on whether the circular masses 607 and 609 rotate in a clockwise or counterclockwise manner. The sensor 604 includes circuitry (not shown) configured to sense these changes in capacitance values, and to provide velocity sense signals indicative of the vibration velocity of the circular masses 607 and 609 based on the changing capacitance values.

Those of ordinary skill in the art will appreciate that as the circular masses 607 and 609 vibrate about the rotation axes 682 and 684, respectively, while the sensor 604 rotates about a radial axis (not labeled) of the masses 607 and 609, the masses 607 and 609 undergo Coriolis acceleration. Further, because the circular masses 607 and 609 vibrate in antiphase, the Coriolis acceleration is imposed on the respective masses in opposite directions. As a result, apparent Coriolis forces are applied to the circular masses 607 and 609, deflecting the masses 607 and 609 in opposite directions relative to the substrate 608.

For example, "+" and "−" signs are employed in FIG. 6 to indicate the relative directions of deflection of the circular masses 607 and 609 due to the applied Coriolis forces. As shown in FIG. 6, the acceleration sense electrode structures 612–613 and 616–617 of the mass 607 are labeled −, +, −, and +, respectively, and the corresponding acceleration sense electrode structures 614–615 and 618–619 of the mass 609 are labeled with the opposite signs +, −, +, and −, respectively, to indicate that the applied Coriolis forces deflect these corresponding regions of the masses 607 and 609 in opposite directions relative to the substrate 608.

It is noted that the acceleration sense electrode structures 612–613 along the longitudinal axis, and the acceleration sense electrode structures 616–617 along the lateral axis, of the circular mass 607, are labeled with the opposite signs − and +, respectively. Similarly, the acceleration sense electrode structures 614–615 along the longitudinal axis, and the acceleration sense electrode structures 618–619 along the lateral axis, of the circular mass 609, are labeled with the opposite signs + and −, respectively. This is because, in the presently disclosed embodiment, the circular masses 607 and 609 are rigid structures configured to tilt relative to the substrate 608 in response to the applied Coriolis forces.

Moreover, because the applied Coriolis forces deflect the circular masses 607 and 609 in opposite directions, the responses of the masses 607 and 609 to Coriolis acceleration relative to the rotation axes $X_R$ and $Y_R$ are in antiphase, while the responses of the circular masses 607 and 609 to linear acceleration relative to the acceleration axis $Z_A$ are in phase. Accordingly, the electrically independent sense signals provided via the acceleration sense electrode structures 612–619 can be suitably added and/or subtracted to extract information corresponding to the linear acceleration (i.e., the acceleration sensing information), and to extract information corresponding to the Coriolis acceleration (i.e., the angular rate sensing information), from the sense signals.

Figure 7:
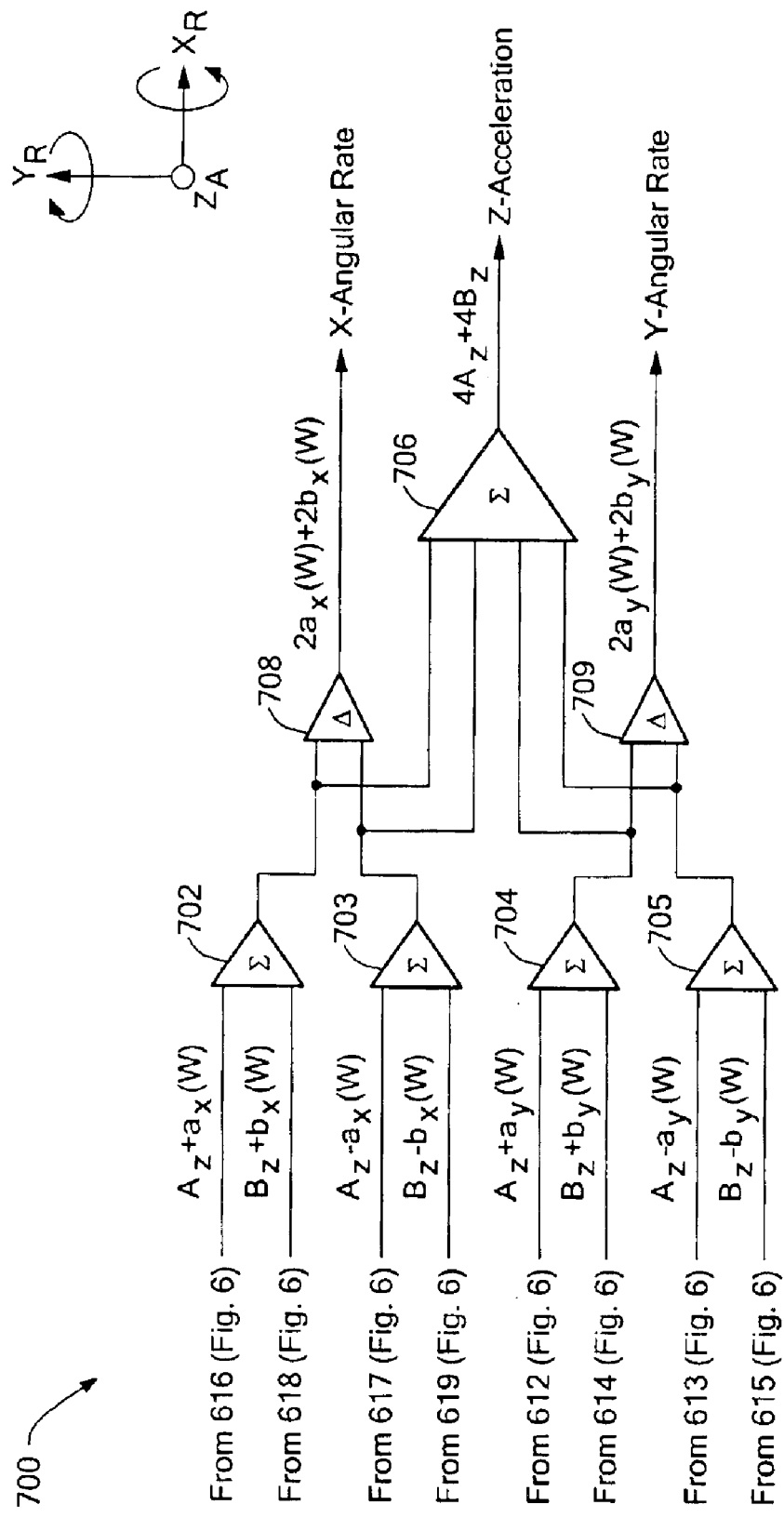
FIG. 7 is a schematic diagram of acceleration sense signal processing circuitry for the second multi-sensor substructure of FIG. 5.

FIG. 7 depicts an illustrative embodiment of acceleration sense signal processing circuitry 700, which is configured to extract the acceleration sensing information and the angular rate sensing information from the acceleration sense signals provided by the acceleration sense electrode structures 612–619 (see FIG. 6). For example, the signal processing circuitry 700 may be implemented on the same substrate as the sensor 604. In the illustrated embodiment, the sense signal processing circuitry 700 includes a plurality of summing amplifiers 702–706, and a plurality of difference amplifiers 708–709, which add/subtract the accelerations sensed by the acceleration sense electrode structures 612–619 to extract the acceleration sensing and angular rate sensing information.

Specifically, the acceleration sensed by the acceleration sense electrode structures 612–613 includes a linear component $A_Z$ relative to the acceleration axis $Z_A$, and a time-varying rotational component $a_y(w)$ relative to the rotation axis $Y_R$; and, the acceleration sensed by the acceleration sense electrode structures 614–615 includes a linear component $B_Z$ relative to the acceleration axis $Z_A$, and a time-varying rotational component $b_y(w)$ relative to the rotation axis $Y_R$. It is noted that the rotational components $a_y(w)$ and $b_y(w)$ vary at an angular vibrating frequency w, and are proportional to the rate of rotation about a radial axis perpendicular to the vibration velocity vector. Because the vibration velocities of the masses 607 and 609 are opposed, the accelerations sensed by the acceleration sense electrode structures 612–613 are $A_z+a_y(w)$ and $A_z-a_y(w)$, respectively, and the accelerations sensed by the acceleration sense electrode structures 614–615 are $B_z+b_y(w)$ and $B_z-b_y(w)$, respectively. Similarly, the accelerations sensed by the acceleration sense electrode structures 616–617 are $A_z+a_x(w)$ and $A_z-a_x(w)$, respectively, and the accelerations sensed by the acceleration sense electrode structures 618–619 are $B_z+b_x(w)$ and $B_z-b_x(w)$, respectively.

As described above, the responses of the circular masses 607 and 609 (see FIG. 6) to Coriolis acceleration relative to the rotation axes $X_R$ and $Y_R$ are in antiphase, while the responses of the circular masses 607 and 609 to linear acceleration relative to the acceleration axis $Z_A$ are in phase. Accordingly, the responses of the circular masses 607 and 609 to Coriolis acceleration relative to the rotation axes $X_R$ and $Y_R$, as represented by the accelerations $a_y(w)$ and $-a_y(w)$, $b_y(w)$ and $-b_y(w)$, $a_x(w)$ and $-a_x(w)$, and $b_x(w)$ and $-b_x(w)$, are in antiphase, while the responses of the masses 607 and 609 to linear acceleration relative to the acceleration axis $Z_A$, as represented by the accelerations $A_z$ and $B_z$, are in phase.

As shown in FIG. 7, signals representative of the accelerations $A_z+a_x(w)$ and $B_z+b_x(w)$ sensed by the electrode structures 616 and 618 are applied to the summing amplifier 702, which is configured to add these accelerations. Similarly, signals representative of the accelerations $A_z-a_x(w)$ and $B_z-b_x(w)$ sensed by the electrode structures 617 and 619 are applied to the summing amplifier 703, which is configured to add these accelerations. Next, the summing amplifiers 702–703 apply the resulting signals at their respective outputs to the difference amplifier 708, which is configured to subtract these signals to cancel out the linear components $A_z$ and $B_z$, leaving the rotational components $2a_x(w)+2b_x(w)$ indicative of angular rate sensing relative to the rotation axis $X_R$ ("X-Angular Rate").

Further, signals representative of the accelerations $A_z+a_y(w)$ and $B_z+b_y(w)$ sensed by the electrode structures 612 and 614 are applied to the summing amplifier 704, which is configured to add these accelerations. Similarly, signals representative of the accelerations $A_z-a_y(w)$ and $B_z-b_y(w)$ sensed by the electrode structures 613 and 615 are applied to the summing amplifier 705, which is configured to add these accelerations. Next, the summing amplifiers 704–705 apply the resulting signals at their respective outputs to the difference amplifier 709, which is configured to subtract these signals to cancel out the linear components $A_z$ and $B_z$, leaving the rotational components $2a_y(w)+2b_y(w)$ indicative of angular rate sensing relative to the rotation axis $Y_R$ ("Y-Angular Rate").

Moreover, the summing amplifiers 702–705 apply the resulting signals at their respective outputs to the summing amplifier 706, which is configured to add these signals to cancel out the rotational components $a_x(w)$, $b_x(w)$, $a_y(w)$, and $b_y(w)$, leaving the linear components $4A_z+4B_z$ indicative of acceleration sensing relative to the acceleration axis $Z_A$ ("Z-Acceleration").

Figure 8:
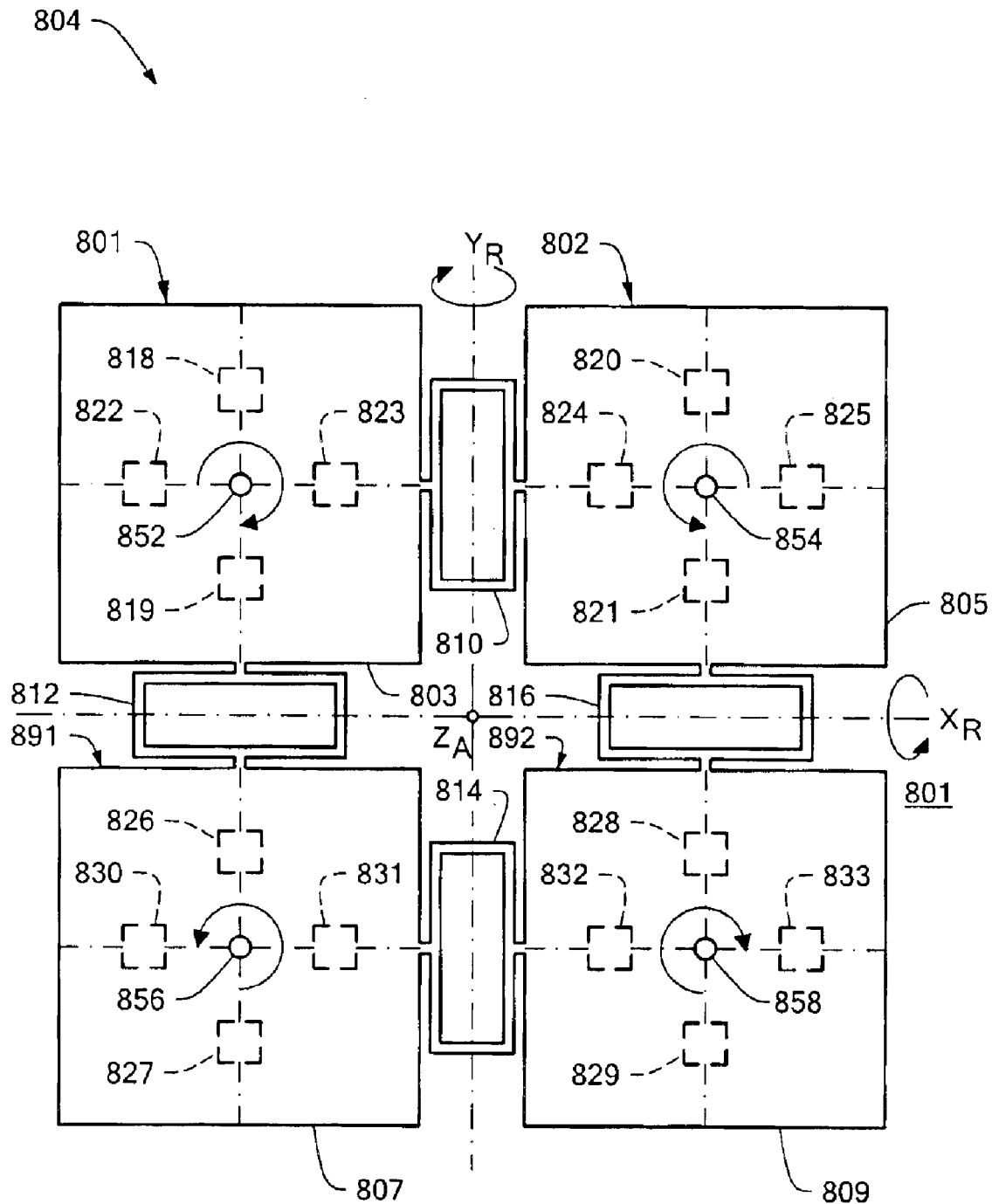
FIG. 8 is a block diagram of an alternative embodiment of the second multi-sensor substructure of FIG. 5.

FIG. 8 depicts a second illustrative embodiment 804 of the sensor 104 (see FIG. 1). In the illustrated embodiment, the sensor 804 comprises accelerometers 801, 802, 891, and 892, which are arranged to form a square. The accelerometers 801, 802, 891, and 892 include masses 803, 805, 807, and 809, respectively, each of which is substantially square-shaped. It should be understood, however, that the masses 803, 805, 807, and 809 may alternatively be substantially circular, hexagonal, octagonal, or any other suitable geometric shape.

The square masses 803, 805, 807, and 809 are suspended over and anchored to a substrate 808 by a plurality of flexures (not shown). The sensor 804 further comprises a fork member 810 coupling the adjacent masses 803 and 805, a fork member 812 coupling the adjacent masses 803 and 807, a fork member 814 coupling the adjacent masses 807 and 809, and a fork member 816 coupling the adjacent masses 805 and 809. The fork members 810, 812, 814, and 816 are configured to couple the masses 803, 805, 807, and 809 to allow relative antiphase rotational movement, and to resist in phase rotational movement, of the adjacent masses about rotation axes 852, 854, 856, and 858.

Like the substrate 608 of the sensor 604 (see FIG. 6), the substrate 808 of the sensor 804 (see FIG. 8) may comprise a silicon substrate, or any other suitable type of substrate. Further, the substrate 808 may be subjected to any suitable bulk micro-machining process to form the MEMS multi-sensor device.

As shown in FIG. 8, the sensor 804 has two associated mutually orthogonal rotation-sensing axes $X_R$ and $Y_R$ in the plane of the substrate 808, and one associated acceleration-sensing axis $Z_A$ perpendicular to the rotations axes $X_R$ and $Y_R$. Like the sensor 604 (see FIG. 6), the sensor 804 provides two indications of angular rate sensing relative to the rotation axes $X_R$ and $Y_R$, and one indication of acceleration sensing relative to the acceleration axis $Z_A$.

The sensor 804 also includes acceleration sense electrode structures 818–821, 826–829 and 822–825, 830–833 diametrically disposed along longitudinal and lateral axes, respectively, of the masses 803, 805, 807, and 809. Each one of the acceleration sense electrode structures 818–833 includes a first electrode disposed on the surface of a respective mass, and a second electrode disposed on the surface of the substrate 808 opposite the first electrode, to form a differential capacitor having a capacitance value that varies based on the distance between the first and second electrodes. Such capacitance values are employed to provide electrically independent acceleration sense signals including information pertaining to angular rate sensing and acceleration sensing relative to the rotation axes $X_R$, $Y_R$ and the acceleration axis $Z_A$, respectively.

For example, the acceleration sense electrode structures 818–819, 820–821, 826–827, and 828–829 may be employed to provide indications of accelerations $A_z+a_y(w)$ and $A_z-a_y(w)$, $B_z+b_y(w)$ and $B_z-b_y(w)$, $C_z+c_y(w)$ and $C_z-c_y(w)$, and $D_z+d_y(w)$ and $D_z-d_y(w)$, respectively, in which $A_z$, $B_z$, $C_z$, and $D_z$ are linear acceleration components relative to acceleration axis $Z_A$, and $a_y(w)$, $b_y(w)$, $c_y(w)$, and $d_y(w)$ are time-varying rotational acceleration components relative to the rotation axis $Y_R$. Further, the acceleration sense electrode structures 822–823, 830–831, 824–825, and 832–833 may be employed to provide indications of accelerations $A_z+a_x(w)$ and $A_z-a_x(w)$, $B_z+b_x(w)$ and $B_z-b_x(w)$, $C_z+c_x(w)$ and $C_z-c_x(w)$, and $D_z+d_x(w)$ and $D_z-d_x(w)$, respectively, in which $a_x(w)$, $b_x(w)$, $c_x(w)$, and $d_x(w)$ are time-varying rotational acceleration components relative to the rotation axis $X_R$. By suitably subtracting the respective accelerations, the linear components cancel out, leaving the rotational components including information pertaining to angular rate sensing relative to the rotation axes $X_R$ and $Y_R$. Moreover, by suitably adding the respective accelerations, the rotational components cancel out, leaving the linear components including information pertaining to acceleration sensing relative to the acceleration axis $Z_A$.

Figure 9:
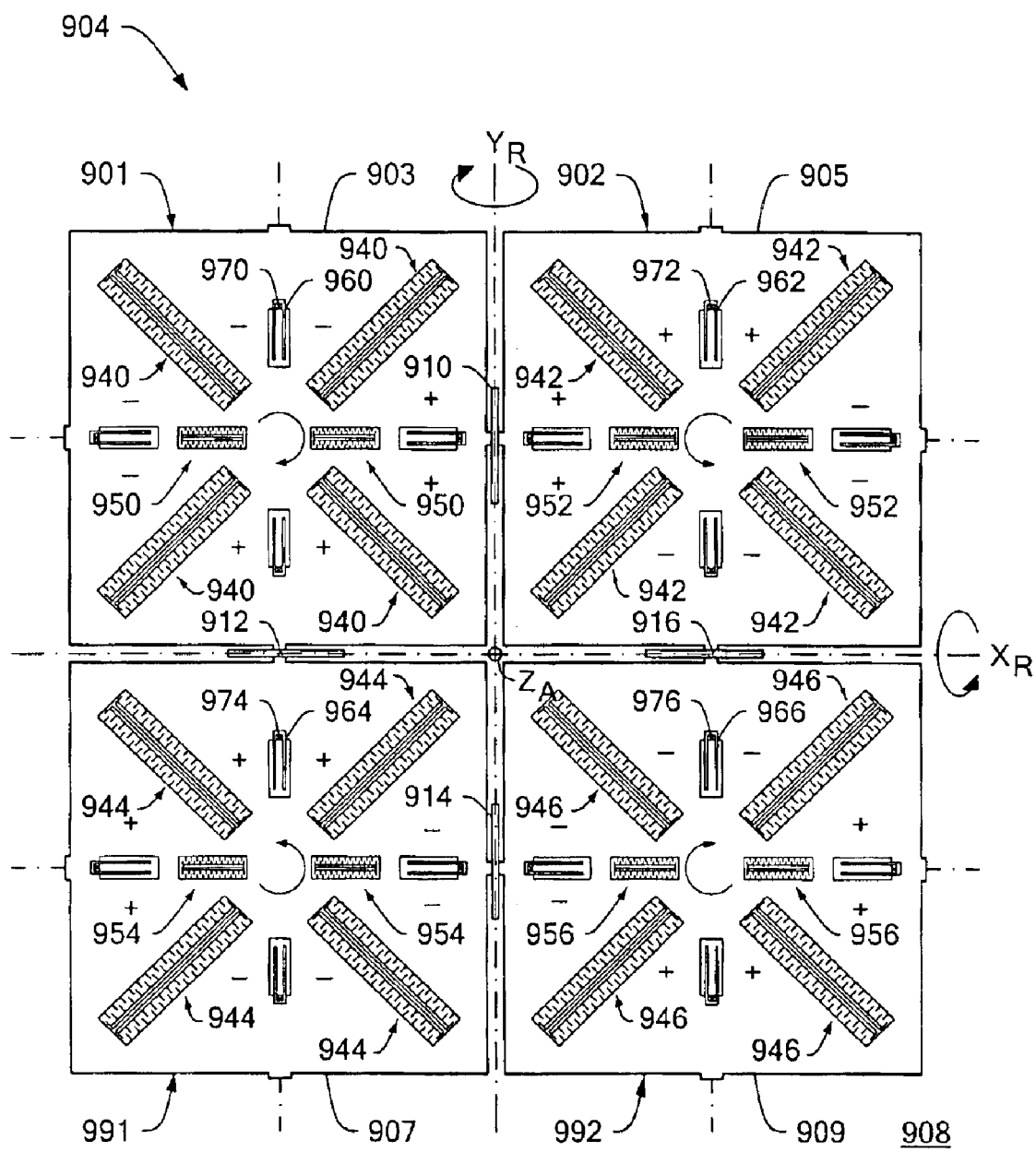
FIG. 9 is a detailed plan view of the alternative embodiment of the second multi-sensor substructure of FIG. 8.

FIG. 9 depicts a detailed plan view 904 of the sensor 804 (see FIG. 8). As shown in FIG. 9, the sensor 904 comprises accelerometers 901, 902, 991, and 992. The accelerometers 901, 902, 991, and 992 include substantially square-shaped masses 903, 905, 907, and 909, respectively, anchored to and suspended over a substrate 908 by a plurality of flexures. Specifically, each of the flexure structures anchoring and suspending the mass 903 includes an anchor such as the anchor 970 and a stress relief member such as the stress relief member 960, each flexure anchoring/suspending the mass 905 includes an anchor such as the anchor 972 and a stress relief member such as the stress relief member 962, each flexure anchoring/suspending the mass 907 includes an anchor such as the anchor 974 and a stress relief member such as the stress relief member 964, and each flexure anchoring/suspending the mass 909 includes an anchor such as the anchor 976 and a stress relief member such as the stress relief member 966. It is noted that the anchor/stress relief member pairs are disposed along longitudinal and lateral axes of the respective masses 903, 905, 907, and 909. The sensor 904 further comprises fork members 910, 912, 914, and 916 configured to couple the adjacent masses to allow relative antiphase rotational movement, and to resist in phase rotational movement, of the masses, as known in the art.

It is noted that the masses 903, 905, 907, and 909, and the fork members 910, 912, 914, and 916, are substantially equivalent to the masses 803, 805, 807, and 809, and the fork members 810, 812, 814, and 816, respectively, of the sensor 804 (see FIG. 8). Further, rotation-sensing axes $X_R$ and $Y_R$ and acceleration-sensing axis $Z_A$, as depicted in FIG. 9, correspond to the rotation-sensing axes $X_R$ and $Y_R$ and the acceleration-sensing axis $Z_A$ described above with reference to FIG. 8.

The sensor 904 (see FIG. 9) includes a plurality of drive electrode structures 940, 942, 944, and 946 anchored to the substrate 908, and configured for rotationally vibrating the masses 903, 905, 907, and 909, respectively, such that the adjacent masses vibrate in antiphase. Each of the drive electrode structures 940, 942, 944, and 946 includes a plurality of fingers disposed along a radial axis of the mass, and interdigitated with a corresponding plurality of fingers extending from at least one radial edge of the mass. In the preferred embodiment, the drive electrode structures 940, 942, 944, and 946 are diagonally disposed on the masses 903, 905, 907, and 909, respectively.

The sensor 904 also includes a plurality of velocity sense electrode structures 950, 952, 954, and 956 anchored to the substrate 908, and configured to sense the vibration velocity of the masses 903, 905, 907, and 909, respectively. Like the drive electrode structures 940, 942, 944, and 946, each of the velocity sense electrode structures 950, 952, 954, and 956 includes a plurality of fingers disposed along a radial axis of the mass, and interdigitated with a corresponding plurality of fingers extending from at least one radial edge of the mass. In the preferred embodiment, the velocity sense electrode structures 950, 952, 954, and 956 are disposed along the lateral axes of the masses 903, 905, 907, and 909, respectively. It is noted that "+" and "−" signs are employed in FIG. 9 to indicate the relative directions of deflection of the vibrating masses 903, 905, 907, and 909 due to Coriolis forces applied thereto, as the sensor 904 rotates about a radial axis (not labeled) of the masses.

It should be appreciated that the accelerometers 901, 902, 991, and 992, and the fork members 910, 912, 914, and 916, are arranged in mirror image fashion on each side of a lateral axis of symmetry, and on each side of a longitudinal axis of symmetry, of the sensor 904. Accordingly, the sensor 904 can be symmetrically centered on a die (not shown) to reduce adverse effects of die surface area distortions and gradients on the performance of the sensor.

Figure 10:
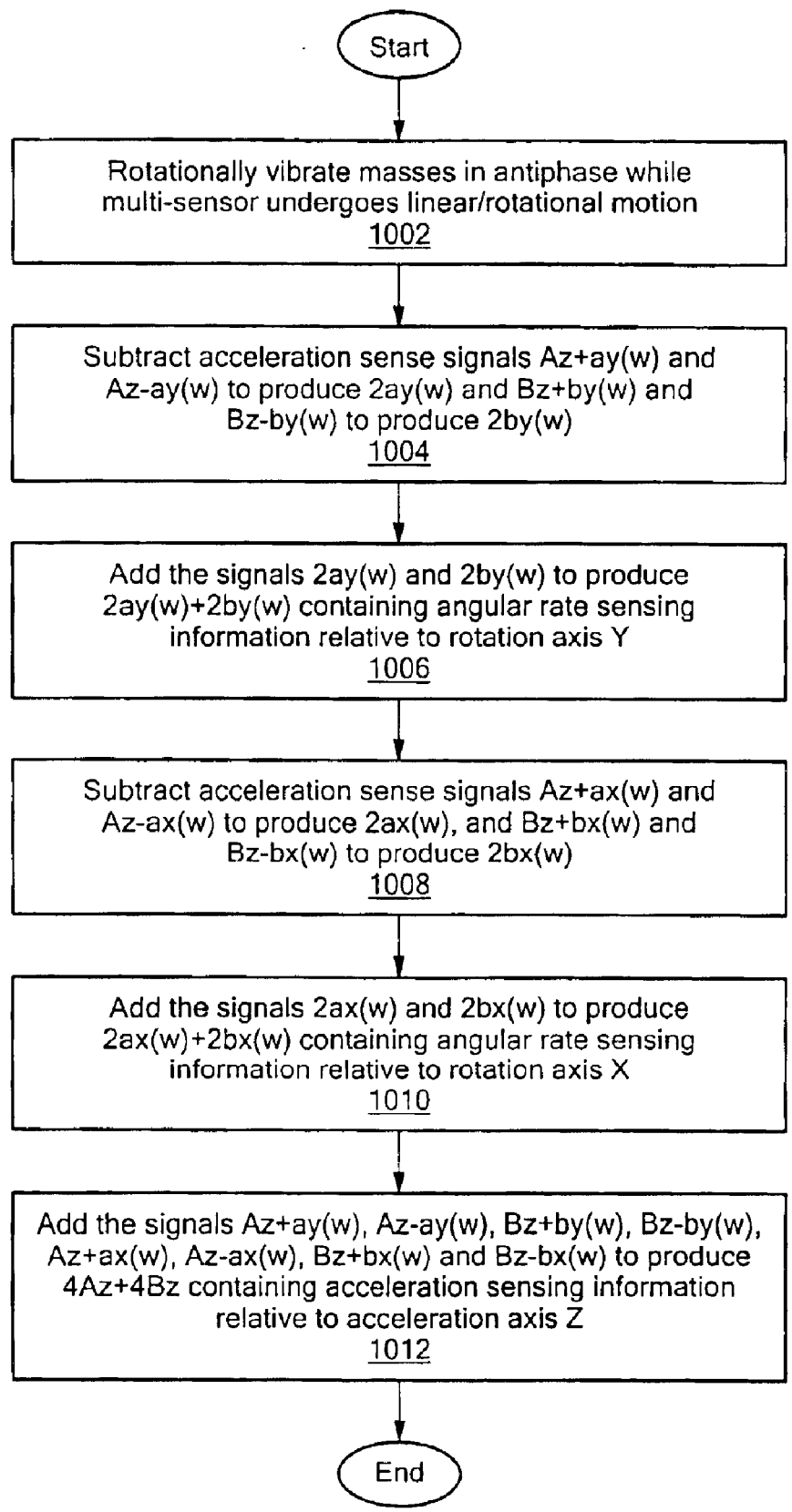
FIG. 10 is a flow diagram of a method of operating the second multi-sensor substructure of FIG. 5.

A method of operating the presently disclosed multi-sensor substructure 105 (see FIG. 1) including the sensor 604 (see FIG. 6) is illustrated by reference to FIG. 10. As depicted in step 1002, the masses 607 and 609 are rotationally vibrated in antiphase about the rotation axes 682 and 684, respectively, while the sensor 604 undergoes linear/rotational motion. It is understood that the axes of rotation $X_R$ and $Y_R$ are in the plane of the sensor substrate 608, and the axis of linear acceleration $Z_A$ is perpendicular to the rotation axes. Next, the acceleration sense signals $A_z+a_y(w)$ and $A_z-a_y(w)$ generated by the acceleration sense electrode structures 612–613, respectively, are subtracted, as depicted in step 1004, to produce the difference of the sense signals $2a_y(w)$, and the acceleration sense signals $B_z+b_y(w)$ and $B_z-b_y(w)$ generated by the acceleration sense electrode structures 614–615, respectively, are subtracted, as also depicted in step 1004, to produce the difference of the sense signals $2b_y(w)$. The signals $2a_y(w)$ and $2b_y(w)$ are then added, as depicted in step 1006, to produce the sum of the signals $2a_y(w)+2b_y(w)$, which contains information pertaining to angular rate sensing relative to the rotation axis $Y_R$ (Y-Angular Rate). Next, the acceleration sense signals $A_z+a_x(w)$ and $A_z-a_x(w)$ generated by the acceleration sense electrode structures 616–617, respectively, are subtracted, as depicted in step 1008, to produce the difference of the sense signals $2a_x(w)$, and the acceleration sense signals $B_z+b_x(w)$ and $B_z-b_x(w)$ generated by the acceleration sense electrode structures 618–619, respectively, are subtracted, as also depicted in step 1008, to produce the difference of the sense signals $2b_x(w)$. The signals $2a_x(w)$ and $2b_x(w)$ are then added, as depicted in step 1010, to produce the sum of the signals $2a_x(w)+2b_x(w)$, which contains information pertaining to angular rate sensing relative to the rotation axis $X_R$ (X-Angular Rate). Finally, the signals $A_z+a_y(w)$, $A_z-a_y(w)$, $B_z+b_y(w)$, $B_z-b_y(w)$, $A_z+a_x(w)$, $A_z-a_x(w)$, $B_z+b_x(w)$, and $B_z-b_x(w)$ are added, as depicted in step 1012, to produce the sum $4A_z+4B_z$, which contains information pertaining to acceleration sensing relative to the acceleration axis $Z_A$ (Z-Acceleration).

As described above, the sensor 201 (see FIG. 2) and the sensor 904 (see FIG. 9) can be symmetrically centered on respective dies (not shown) to reduce the adverse effects of die surface area distortions and gradients on the performance of the sensors. It should be appreciated that because the sensors 201 and 904 are implemented on the respective dies within the six degree-of-freedom micro-machined multi-sensor device 100 (see FIG. 1), yields are increased, and gyroscopic interference between the sensors is reduced.

It will further be appreciated by those of ordinary skill in the art that modifications to and variations of the above-described six degree-of-freedom micro-machined multi-sensor may be made. For example, it was described with reference to FIG. 1 that the substrates 102 and 108 may be coplanar and the X and Y axes may be in the plane of the substrates 102 and 108. The substrates 102 and 108 may also be combined such that the respective sensors corresponding thereto have quadrilateral symmetry. More specifically, the sensor 201 (see FIG. 2) and the sensor 904 (see FIG. 9) may be positioned on axes bisecting a die such that surface stress effects cancel, even without centering the sensor structures. Moreover, a stress isolator (not shown) may be suitably configured to ease the symmetry requirement. Further modifications to and variations of the above-described multi-sensor may be made without departing from the inventive concepts disclosed herein. Accordingly, the invention should not be viewed as limited except as by the scope and spirit of the appended claims.

What is claimed is:

1. A six degree-of-freedom multi-sensor, comprising:
   a first substrate;
   a second substrate;
   a first multi-sensor substructure fabricated on the first substrate, the first multi-sensor substructure operative to provide a first plurality of sense signals indicative of acceleration sensing relative to mutually orthogonal first and second axes in the plane of the first substrate, and indicative of angular rate sensing relative to a third axis perpendicular to the first and second axes; and
   a second multi-sensor substructure fabricated on the second substrate, the second multi-sensor substructure operative to provide a second plurality of sense signals indicative of angular rate sensing relative to mutually orthogonal fourth and fifth axes in the plane of the second substrate, and indicative of acceleration sensing relative to a sixth axis perpendicular to the fourth and fifth axes,
   wherein the first multi-sensor substructure includes
   a substantially planar accelerometer frame;
   a first proof mass coupled to the frame;
   a second proof mass coupled to the frame;
   a first pair of diametrically opposed acceleration sense electrode structures coupled to the frame and disposed along the first axis; and
   a second pair of diametrically opposed acceleration sense electrode structures coupled to the frame and disposed along the second axis,
   wherein the first and second proof masses are configured to vibrate in antiphase along a vibration axis, the vibration axis being in a plane defined by the first and second axes, and
   wherein each acceleration sense electrode structure is configured to produce a respective one of the first plurality of sense signals, each sense signal being electrically independent of the remaining sense signals.

2. The six degree-of-freedom multi-sensor of claim 1 further including a signal processing unit configured to extract information pertaining to acceleration sensing along the first and second axes, and to extract information pertaining to angular rate sensing relative to the third axis.

3. The six degree-of-freedom multi-sensor of claim 1 further including a resilient member resiliently coupling the first proof mass and the second proof mass.

4. The six degree-of-freedom multi-sensor of claim 1 further including a first amplifier configured to receive a differential sense signal from one of the first pair of acceleration sense electrode structures, and to produce a first sense signal, and a second amplifier configured to receive a differential sense signal from the other of the first pair of acceleration sense electrode structures, and to produce a second sense signal.

5. The six degree-of-freedom multi-sensor of claim 4 further including a third amplifier configured to receive the first and second sense signals, and to produce a third sense signal comprising the sum of the first and second sense signals, the third sense signal being indicative of acceleration sensing along the first axis.

6. The six degree-of-freedom multi-sensor of claim 1 further including a first amplifier configured to receive a differential sense signal from one of the second pair of acceleration sense electrode structures, and to produce a first sense signal, and a second amplifier configured to receive a differential sense signal from the other of the second pair of acceleration sense electrode structures, and to produce a second sense signal.

7. The six degree-of-freedom multi-sensor of claim 6 further including a third amplifier configured to receive the first and second sense signals, and to produce a third sense signal comprising the sum of the first and second sense signals, the third sense signal being indicative of acceleration sensing along the second axis.

8. The six degree-of-freedom multi-sensor of claim 1 further including a first amplifier configured to receive a differential sense signal from one of the first pair of acceleration sense electrode structures, and to produce a first sense signal, a second amplifier configured to receive a differential sense signal from the other of the first pair of acceleration sense electrode structures, and to produce a second sense signal, a third amplifier configured to receive a differential sense signal from one of the second pair of acceleration sense electrode structures, and to produce a third sense signal, and a fourth amplifier configured to receive a differential sense signal from the other of the second pair of acceleration sense electrode structures, and to produce a fourth sense signal.

9. The six degree-of-freedom multi-sensor of claim 8 further including a fifth amplifier configured to receive the first and second sense signals, and to produce a fifth sense signal comprising the difference of the first and second sense signals, and a sixth amplifier configured to receive the third and fourth sense signals, and to produce a sixth sense signal comprising the difference of the third and fourth sense signals.

10. The six degree-of-freedom multi-sensor of claim 9 further including a seventh amplifier configured to receive the fifth and sixth sense signals, and to produce a seventh sense signal comprising the sum of the fifth and sixth sense signals, the seventh sense signal being indicative of angular rate sensing relative to the third axis.

11. The six degree-of-freedom multi-sensor of claim 10 further including a velocity sense electrode structure configured to produce a velocity sense signal, the velocity sense signal being in phase with a vibration velocity of the first and second proof masses and asynchronous with a linear acceleration of the first and second proof masses.

12. The six degree-of-freedom multi-sensor of claim 11 further including a phase demodulator configured to receive the seventh sense signal and the velocity sense signal, and to produce an eighth sense signal indicative of angular rate sensing relative to the third axis.

13. The six degree-of-freedom multi-sensor of claim 1 wherein the first and second substrates are combined to form a single substrate.

14. A six degree-of-freedom multi-sensor, comprising:

a first substrate, a second substrate;

a first multi-sensor substructure fabricated on the first substrate, the first multi-sensor substructure operative to provide a first plurality of sense signals indicative of acceleration sensing relative to mutually orthogonal first and second axes in the plane of the first substrate, and indicative of angular rate sensing relative to a third axis perpendicular to the first and second axes; and a second multi-sensor substructure fabricated on the second substrate, the second multi-sensor substructure operative to provide a second plurality of sense signals indicative of angular rate sensing relative to mutually orthogonal fourth and fifth axes in the plane of the second substrate, and indicative of acceleration sensing relative to a sixth axis perpendicular to the fourth and fifth axes, wherein the second multi-sensor substructure includes at least one first mass coupled to and suspended over the second substrate, the first mass having associated longitudinal and lateral axes, and an associated rotation axis perpendicular to the longitudinal and lateral axes;

at least one second mass coupled to and suspended over the second substrate, the second mass having associated longitudinal and lateral axes, and an associated rotation axis perpendicular to the longitudinal and lateral axes, the second mass being adjacent to the first mass, at least one drive structure operatively coupled to the first and second masses, the drive structure being configured to vibrate the first and second masses in antiphase about the respective rotation axes;

first and second pairs of diametrically opposed acceleration sensing structures operatively coupled to the first mass, the first and second acceleration sensing structure pairs being disposed along the longitudinal and lateral axes, respectively, of the first mass; and third and fourth pairs of diametrically opposed acceleration sensing structures operatively coupled to the second mass, the third and fourth acceleration sensing structure pairs being disposed along the longitudinal and lateral axes, respectively, of the second mass, wherein the respective longitudinal axes are parallel to the fourth axis, and the respective lateral axes are parallel to the fifth axis, and wherein each acceleration sensing structure is configured to produce a respective sense signal, the respective sense signals being indicative of angular rate sensing relative to the fourth and fifth axes, and being further indicative of acceleration sensing relative to the sixth axis.

15. The six degree-of-freedom multi-sensor of claim 14 wherein each of the respective sense signals produced by the first and third pairs of acceleration sensing structures includes a linear component relative to the sixth axis and a rotational component relative to the fourth axis, and wherein each of the respective sense signals produced by the second and fourth pairs of acceleration sensing structures includes a linear component relative to the sixth axis and a rotational component relative to the fifth axis.

16. The six degree-of-freedom multi-sensor of claim 15 further including a signal processing unit configured to combine the respective linear sense signal components produced by the first, second, third, and fourth pairs of acceleration sensing structures to produce an output signal including information pertaining to acceleration sensing relative to the sixth axis.

17. The six degree-of-freedom multi-sensor of claim 15 further including a signal processing unit configured to combine the respective rotational sense signal components produced by the first and third pairs of acceleration sensing structures to produce an output signal including information pertaining to angular rate sensing relative to the fourth axis.

18. The six degree-of-freedom multi-sensor of claim 15 further including a signal processing unit configured to combine the respective rotational sense signal components produced by the second and fourth pairs of acceleration sensing structures to produce an output signal including information pertaining to angular rate sensing relative to the fifth axis.

19. The six degree-of-freedom multi-sensor of claim 14 further including a resilient member coupling the first mass and the second mass, the resilient member being configured to allow the antiphase vibrational movement, and to resist in phase vibrational movement, of the respective masses.

20. The six degree-of-freedom multi-sensor of claim 14 further including a first amplifier configured to receive a pair of first sense signals from the first pair of acceleration sensing structures, and a third amplifier configured to receive a pair of third sense signals from the third pair of acceleration sensing structures, the first and third amplifiers being further configured to produce first and third output signals comprising the difference of the pair of first sense signals, and the difference of the pair of third sense signals, respectively, the first and third output signals being indicative of angular rate sensing relative to the fourth axis.

21. The six degree-of-freedom multi-sensor of claim 14 further including a second amplifier configured to receive a pair of second sense signals from the second pair of acceleration sensing structures, and a fourth amplifier configured to receive a pair of fourth sense signals from the fourth pair of acceleration sensing structures, the second and fourth amplifiers being further configured to produce second and fourth output signals comprising the difference of the pair of second sense signals, and the difference of the pair of fourth sense signals, respectively, the second and fourth output signals being indicative of angular rate sensing relative to the fifth axis.

22. The six degree-of-freedom multi-sensor of claim 14 further including a first amplifier configured to receive a pair of first sense signals from the first pair of acceleration sensing structures, a second amplifier configured to receive a pair of second sense signals from the second pair of acceleration sensing structures, a third amplifier configured to receive a pair of third sense signals from the third pair of acceleration sensing structures, and a fourth amplifier configured to receive a pair of fourth sense signals from the fourth pair of acceleration sensing structures, the first, second, third, and fourth amplifiers being further configured to produce first, second, third, and fourth output signals comprising the sum of the pair of first sense signals, the sum of the pair of second sense signals, the sum of the pair of third sense signals, and the sum of the pair of fourth sense signals, respectively, the first, second, third, and fourth output signals being indicative of acceleration sensing relative to the sixth axis.

23. The six degree-of-freedom multi-sensor of claim 14 including two first masses and two second masses suspended over the substrate, the four masses being arranged so that each mass is adjacent to two other masses, and wherein the drive structure is configured to vibrate the four masses in antiphase about the respective rotation axes so that each mass moves in an equal and opposite manner relative to an adjacent mass.

24. A method of operating a six degree-of-freedom multi-sensor, comprising the steps of:
providing a first plurality of sense signals by a first multi-sensor substructure, the first plurality of sense signals being indicative of acceleration sensing relative to mutually orthogonal first and second axes in the plane of a first substrate, and indicative of angular rate sensing relative to a third axis perpendicular to the first and second axes, the first multi-sensor substructure being implemented on the first substrate;
providing a second plurality of sense signals by a second multi-sensor substructure, the second plurality of sense signals being indicative of angular rate sensing relative to mutually orthogonal fourth and fifth axes in the plane of a second substrate, and indicative of acceleration sensing relative to a sixth axis perpendicular to the fourth and fifth axes, the second multi-sensor substructure being implemented on the second substrate;
vibrating in antiphase a first proof mass and a second proof mass along a vibration axis by a drive electrode structure, the first proof mass being coupled to an accelerometer frame, and the second proof mass being coupled to the accelerometer frame; producing respective first accelerometer sense signals by a first pair of diametrically opposed acceleration sense electrode structures coupled to the frame and disposed along the first axis; and
producing respective second accelerometer sense signals by a second pair of diametrically opposed acceleration sense electrode structures coupled to the frame and disposed along the second axis, the first and second proof masses, the drive electrode structure, and the first and second pairs of acceleration sense electrode structures being included in the first multi-sensor substructure,
wherein each sense signal produced in the first and second producing steps is electrically independent of the remaining sense signals.

25. The method of claim 24 further including the steps of extracting information pertaining to acceleration sensing along the first and second axes and extracting information pertaining to angular rate sensing relative to the third axis by a signal processing unit.

26. A method of operating a six degree-of-freedom multi-sensor, comprising the steps of:
providing a first plurality of sense signals by a first multi-sensor substructure, the first plurality of sense signals being indicative of acceleration sensing relative to mutually orthogonal first and second axes in the plane of a first substrate, and indicative of angular rate sensing relative to a third axis perpendicular to the first and second axes, the first multi-sensor substructure being implemented on the first substrate;
providing a second plurality of sense signals by a second multi-sensor substructure, the second plurality of sense signals being indicative of angular rate sensing relative to mutually orthogonal fourth and fifth axes in the plane of a second substrate, and indicative of acceleration sensing relative to a sixth axis perpendicular to the fourth and fifth axes, the second multi-sensor substructure being implemented on the second substrate;

vibrating in antiphase at least one first mass and at least one second mass about respective rotation axes by a drive structure, the first and second masses being adjacent to each other and being coupled to and suspended over the second substrate, each mass having associated longitudinal and lateral axes perpendicular to the respective rotation axis, the respective longitudinal axes being parallel to the fourth axis, and the respective lateral axes being parallel to the fifth axis;

producing respective sense signals by first and second pairs of diametrically opposed acceleration sensing structures operatively coupled to the first mass, the first and second acceleration sensing structure pairs being disposed along the longitudinal and lateral axes, respectively, of the first mass; and producing respective sense signals by third and fourth pairs of diametrically opposed acceleration sensing structures operatively coupled to the second mass, the third and fourth acceleration sensing structure pairs being disposed along the longitudinal and lateral axes, respectively, of the second mass, the first and second masses, the drive structure, and the first, second, third, and fourth acceleration sensing structure pairs being included in the second multi-sensor substructure, wherein the respective sense signals produced in the first and second producing steps are indicative of angular rate sensing relative to the fourth and fifth axes, and further indicative of acceleration sensing relative to the sixth axis.

27. The method of claim 26 further including the step of combining respective linear sense signal components produced by the first, second, third, and fourth pairs of acceleration sensing structures to produce an output signal including information pertaining to acceleration sensing relative to the sixth axis by a signal processing unit.

28. The method of claim 26 further including the step of combining respective rotational sense signal components produced by the first and third pairs of acceleration sensing structures to produce an output signal including information pertaining to angular rate sensing relative to the fourth axis by a signal processing unit.

29. The method of claim 26 further including the step of combining the respective rotational sense signal components produced by the second and fourth pairs of acceleration sensing structures to produce an output signal including information pertaining to angular rate sensing relative to the fifth axis by a signal processing unit.

* * * * *

UNITED STATES PATENT AND TRADEMARK OFFICE
CERTIFICATE OF CORRECTION

PATENT NO. : 6,848,304 B2
DATED : February 1, 2005
INVENTOR(S) : John A. Geen

It is certified that error appears in the above-identified patent and that said Letters Patent is hereby corrected as shown below:

Title page,
Item [74], *Attorney, Agent, or Firm*, "Weingarten, Schurgin, Gägnebin & Lebovici LLP" should read -- Weingarten, Schurgin, Gagnebin & Lebovici LLP --;

Column 15,
Line 5, "A," should read -- $A_z$ --.

Signed and Sealed this

Twentieth Day of December, 2005

JON W. DUDAS
*Director of the United States Patent and Trademark Office*